United States Patent
Drasnin

(10) Patent No.: US 10,678,743 B2
(45) Date of Patent: *Jun. 9, 2020

(54) SYSTEM AND METHOD FOR ACCESSORY DEVICE ARCHITECTURE THAT PASSES VIA INTERMEDIATE PROCESSOR A DESCRIPTOR WHEN PROCESSING IN A LOW POWER STATE

(71) Applicant: MICROSOFT TECHNOLOGY LICENSING, LLC, Redmond, WA (US)

(72) Inventor: Sharon Drasnin, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/960,439

(22) Filed: Apr. 23, 2018

(65) Prior Publication Data

US 2018/0246842 A1 Aug. 30, 2018

Related U.S. Application Data

(63) Continuation of application No. 15/050,072, filed on Feb. 22, 2016, now Pat. No. 9,959,241, which is a
(Continued)

(51) Int. Cl.
*G06F 13/42* (2006.01)
*G06F 9/4401* (2018.01)
(Continued)

(52) U.S. Cl.
CPC ........ *G06F 13/4291* (2013.01); *G06F 1/1669* (2013.01); *G06F 1/3296* (2013.01);
(Continued)

(58) Field of Classification Search
CPC ... G06F 3/0202; G06F 13/385; G06F 13/4291
See application file for complete search history.

(56) References Cited

U.S. PATENT DOCUMENTS

| 3,542,453 A | 11/1970 | Kantor |
| 4,237,347 A | 12/1980 | Burundukov et al. |
| (Continued) | | |

FOREIGN PATENT DOCUMENTS

| CN | 1394119 A | 1/2003 |
| CN | 1467615 A | 1/2004 |
| (Continued) | | |

OTHER PUBLICATIONS

Caprio, "Enabling Notification Badges for Whatsapp and Other Android Apps", Retrieved From: http://geek.ng/2013/05/enabling-notification-badges-for-whatsapp-and-other-android-apps.html, May 20, 2014, 7 Pages.
(Continued)

*Primary Examiner* — Tammara R Peyton
(74) *Attorney, Agent, or Firm* — NovoTechIP International PLLC

(57) ABSTRACT

An accessory device architecture is described. In one or more implementations, data is received from an accessory device at an integrated circuit of a computing device, the data usable to enumerate functionality of the accessory device for operation as part of a computing device that includes the integrated circuit. The data is passed by the integrated circuit to an operating system executed on processor of the computing device to enumerate the functionality of the accessory device as part of the integrated circuit.

20 Claims, 6 Drawing Sheets

Related U.S. Application Data continuation of application No. 13/527,263, filed on Jun. 19, 2012, now Pat. No. 9,348,605.

(60) Provisional application No. 61/646,799, filed on May 14, 2012.

(51) Int. Cl.

| | | |
|---|---|---|
| *G06F 3/16* | (2006.01) | |
| *G06F 1/16* | (2006.01) | |
| *G06F 3/02* | (2006.01) | |
| *G06F 3/0488* | (2013.01) | |
| *G06F 1/3296* | (2019.01) | |
| *G06F 11/30* | (2006.01) | |
| *G06F 11/32* | (2006.01) | |
| *G06F 13/40* | (2006.01) | |

(52) U.S. Cl.
CPC ........ *G06F 3/0202* (2013.01); *G06F 3/04886* (2013.01); *G06F 3/167* (2013.01); *G06F 9/4415* (2013.01); *G06F 11/3051* (2013.01); *G06F 11/328* (2013.01); *G06F 13/4068* (2013.01); *G06F 2203/04809* (2013.01); *Y02D 10/14* (2018.01); *Y02D 10/151* (2018.01)

(56) References Cited

U.S. PATENT DOCUMENTS

| | | |
|---|---|---|
| 4,239,338 A | 12/1980 | Borrelli et al. |
| 4,251,791 A | 2/1981 | Yanagisawa et al. |
| 4,294,507 A | 10/1981 | Johnson |
| 4,412,904 A | 11/1983 | Rohr et al. |
| 4,451,113 A | 5/1984 | Zuniga |
| 4,576,436 A | 3/1986 | Daniel |
| 4,615,579 A | 10/1986 | Whitehead |
| 4,643,604 A | 2/1987 | Enrico |
| 4,735,495 A | 4/1988 | Henkes |
| 4,758,087 A | 7/1988 | Hicks, Jr. |
| 4,795,977 A | 1/1989 | Frost et al. |
| 4,799,752 A | 1/1989 | Carome |
| 4,996,511 A | 2/1991 | Ohkawa et al. |
| 5,019,898 A | 5/1991 | Chao et al. |
| 5,067,573 A | 11/1991 | Uchida |
| 5,106,181 A | 4/1992 | Rockwell, III |
| 5,111,223 A | 5/1992 | Omura |
| 5,138,119 A | 8/1992 | Demeo |
| 5,249,978 A | 10/1993 | Gazda et al. |
| 5,313,535 A | 5/1994 | Williams |
| 5,319,455 A | 6/1994 | Hoarty et al. |
| 5,339,382 A | 8/1994 | Whitehead |
| 5,340,528 A | 8/1994 | Machida et al. |
| 5,349,403 A | 9/1994 | Lo |
| 5,404,133 A | 4/1995 | Moriike et al. |
| 5,406,415 A | 4/1995 | Kelly |
| 5,549,212 A | 8/1996 | Kanoh et al. |
| 5,584,713 A | 12/1996 | Kato et al. |
| 5,618,232 A | 4/1997 | Martin |
| 5,621,494 A | 4/1997 | Kazumi et al. |
| 5,648,643 A | 7/1997 | Knowles et al. |
| 5,712,995 A | 1/1998 | Cohn |
| 5,750,939 A | 5/1998 | Makinwa et al. |
| 5,771,042 A | 6/1998 | Santos-Gomez |
| 5,772,903 A | 6/1998 | Hirsch |
| 5,783,250 A | 7/1998 | Kohno |
| 5,806,955 A | 9/1998 | Parkyn, Jr. et al. |
| 5,808,713 A | 9/1998 | Broer et al. |
| 5,838,403 A | 11/1998 | Jannson et al. |
| 5,850,135 A | 12/1998 | Kuki et al. |
| 5,861,990 A | 1/1999 | Tedesco |
| 5,880,725 A | 3/1999 | Southgate |
| 5,886,675 A | 3/1999 | Aye et al. |
| 5,920,315 A | 7/1999 | Santos-Gomez |
| 5,921,652 A | 7/1999 | Parker et al. |
| 5,929,946 A | 7/1999 | Sharp et al. |
| 5,948,990 A | 9/1999 | Hashida |
| 5,957,191 A | 9/1999 | Okada et al. |
| 5,967,637 A | 10/1999 | Ishikawa et al. |
| 5,973,677 A | 10/1999 | Gibbons |
| 5,991,087 A | 11/1999 | Rallison |
| 5,995,084 A | 11/1999 | Chan et al. |
| 5,999,147 A | 12/1999 | Teitel |
| 6,046,857 A | 4/2000 | Morishima |
| 6,072,551 A | 6/2000 | Jannson et al. |
| 6,112,797 A | 9/2000 | Colson et al. |
| 6,124,906 A | 9/2000 | Kawada et al. |
| 6,129,444 A | 10/2000 | Tognoni |
| 6,144,439 A | 11/2000 | Carollo |
| 6,160,264 A | 12/2000 | Rebiere |
| 6,169,829 B1 | 1/2001 | Laming et al. |
| 6,172,807 B1 | 1/2001 | Akamatsu |
| 6,181,852 B1 | 1/2001 | Adams et al. |
| 6,195,136 B1 | 2/2001 | Handschy et al. |
| 6,215,590 B1 | 4/2001 | Okano |
| 6,228,926 B1 | 5/2001 | Golumbic |
| 6,232,934 B1 | 5/2001 | Heacock et al. |
| 6,234,820 B1 | 5/2001 | Perino et al. |
| 6,238,078 B1 | 5/2001 | Hed |
| 6,256,447 B1 | 7/2001 | Laine |
| 6,266,685 B1 | 7/2001 | Danielson et al. |
| 6,278,490 B1 | 8/2001 | Fukuda et al. |
| 6,300,986 B1 | 10/2001 | Travis |
| 6,323,949 B1 | 11/2001 | Lading et al. |
| 6,342,871 B1 | 1/2002 | Takeyama |
| 6,351,273 B1 | 2/2002 | Lemelson et al. |
| 6,353,503 B1 | 3/2002 | Spitzer et al. |
| 6,362,861 B1 | 3/2002 | Hertz et al. |
| 6,411,266 B1 | 6/2002 | Maguire, Jr. |
| 6,417,892 B1 | 7/2002 | Sharp et al. |
| 6,441,362 B1 | 8/2002 | Ogawa |
| 6,442,764 B1 | 9/2002 | Badillo et al. |
| 6,468,672 B1 | 10/2002 | Donova et al. |
| 6,469,755 B1 | 10/2002 | Adachi et al. |
| 6,483,580 B1 | 11/2002 | Xu et al. |
| 6,506,983 B1 | 1/2003 | Babb et al. |
| 6,529,179 B1 | 3/2003 | Hashimoto et al. |
| 6,532,035 B1 | 3/2003 | Saari et al. |
| 6,545,577 B2 | 4/2003 | Yap |
| 6,553,165 B1 | 4/2003 | Temkin et al. |
| 6,555,024 B2 | 4/2003 | Ueda et al. |
| 6,574,030 B1 | 6/2003 | Mosier |
| 6,648,485 B1 | 11/2003 | Colgan et al. |
| 6,661,436 B2 | 12/2003 | Barksdale et al. |
| 6,675,865 B1 | 1/2004 | Yoshida |
| 6,681,333 B1 | 1/2004 | Cho |
| 6,700,617 B1 | 3/2004 | Hamamura et al. |
| 6,753,920 B1 | 6/2004 | Momose et al. |
| 6,790,054 B1 | 9/2004 | Boonsue |
| 6,792,328 B2 | 9/2004 | Laughery et al. |
| 6,795,146 B2 | 9/2004 | Dozov et al. |
| 6,819,082 B2 | 11/2004 | Yang |
| 6,819,547 B2 | 11/2004 | Minaguchi et al. |
| 6,833,955 B2 | 12/2004 | Niv |
| 6,847,488 B2 | 1/2005 | Travis |
| 6,859,565 B2 | 2/2005 | Baron |
| 6,867,828 B2 | 3/2005 | Taira et al. |
| 6,870,671 B2 | 3/2005 | Travis |
| 6,880,132 B2 | 4/2005 | Uemura |
| 6,895,164 B2 | 5/2005 | Saccomanno |
| 6,898,315 B2 | 5/2005 | Guha |
| 6,902,214 B2 | 6/2005 | Smith |
| 6,916,584 B2 | 7/2005 | Sreenivasan et al. |
| 6,922,333 B2 | 7/2005 | Weng et al. |
| 6,929,291 B2 | 8/2005 | Chen |
| 6,976,999 B2 | 12/2005 | Charlebois et al. |
| 6,980,177 B2 | 12/2005 | Struyk |
| 6,981,792 B2 | 1/2006 | Nagakubo et al. |
| 6,981,887 B1 | 1/2006 | Mese et al. |
| 7,002,624 B1 | 2/2006 | Uchino et al. |
| 7,006,080 B2 | 2/2006 | Gettemy |
| 7,018,678 B2 | 3/2006 | Gronbeck et al. |
| 7,019,491 B2 | 3/2006 | Bozzone et al. |
| 7,023,430 B2 | 4/2006 | Liu et al. |
| 7,025,908 B1 | 4/2006 | Hayashi et al. |

(56) References Cited

U.S. PATENT DOCUMENTS

| | | |
|---|---|---|
| 7,031,894 B2 | 4/2006 | Niu et al. |
| 7,058,252 B2 | 6/2006 | Woodgate et al. |
| 7,066,634 B2 | 6/2006 | Kitamura et al. |
| 7,068,496 B2 | 6/2006 | Wong et al. |
| 7,073,933 B2 | 7/2006 | Gotoh et al. |
| 7,083,295 B1 | 8/2006 | Hanna |
| 7,095,404 B2 | 8/2006 | Vincent et al. |
| 7,099,005 B1 | 8/2006 | Fabrikant et al. |
| 7,101,048 B2 | 9/2006 | Travis |
| 7,102,683 B2 | 9/2006 | Perry et al. |
| 7,104,679 B2 | 9/2006 | Shin et al. |
| 7,116,309 B1 | 10/2006 | Kimura et al. |
| 7,129,979 B1 | 10/2006 | Lee |
| 7,136,282 B1 | 11/2006 | Rebeske |
| 7,151,635 B2 | 12/2006 | Bidnyk et al. |
| 7,152,985 B2 | 12/2006 | Benitez et al. |
| 7,153,017 B2 | 12/2006 | Yamashita et al. |
| 7,162,153 B2 | 1/2007 | Harter, Jr. et al. |
| 7,169,460 B1 | 1/2007 | Chen et al. |
| 7,181,699 B2 | 2/2007 | Morrow et al. |
| 7,189,362 B2 | 3/2007 | Nordin et al. |
| 7,196,758 B2 | 3/2007 | Crawford et al. |
| 7,199,554 B2 | 4/2007 | Kim et al. |
| 7,199,931 B2 | 4/2007 | Boettiger et al. |
| 7,201,508 B2 | 4/2007 | Misaras |
| 7,212,709 B2 | 5/2007 | Hosoi |
| 7,212,723 B2 | 5/2007 | McLeod et al. |
| 7,218,830 B2 | 5/2007 | Iimura |
| 7,224,830 B2 | 5/2007 | Nefian et al. |
| 7,239,505 B2 | 7/2007 | Keely et al. |
| 7,260,823 B2 | 8/2007 | Schlack et al. |
| 7,261,827 B2 | 8/2007 | Ootsu et al. |
| 7,280,348 B2 | 10/2007 | Ghosh |
| 7,283,353 B1 | 10/2007 | Jordan et al. |
| 7,287,738 B2 | 10/2007 | Pitlor |
| 7,295,720 B2 | 11/2007 | Raskar |
| 7,331,793 B2 | 2/2008 | Hernandez et al. |
| 7,333,690 B1 | 2/2008 | Peale et al. |
| 7,348,513 B2 | 3/2008 | Lin |
| 7,364,343 B2 | 4/2008 | Keuper et al. |
| 7,370,342 B2 | 5/2008 | Ismail et al. |
| 7,372,565 B1 | 5/2008 | Holden et al. |
| 7,374,312 B2 | 5/2008 | Feng et al. |
| 7,375,885 B2 | 5/2008 | Ijzerman et al. |
| 7,379,094 B2 | 5/2008 | Yoshida et al. |
| 7,384,178 B2 | 6/2008 | Sumida et al. |
| 7,400,377 B2 | 7/2008 | Evans et al. |
| 7,400,452 B2 | 7/2008 | Detro et al. |
| 7,400,805 B2 | 7/2008 | Abu-Ageel |
| 7,400,817 B2 | 7/2008 | Lee et al. |
| 7,401,992 B1 | 7/2008 | Lin |
| 7,410,286 B2 | 8/2008 | Travis |
| 7,431,489 B2 | 10/2008 | Yeo et al. |
| 7,437,193 B2 | 10/2008 | Parramon et al. |
| 7,437,678 B2 | 10/2008 | Awada et al. |
| 7,443,443 B2 | 10/2008 | Raskar et al. |
| 7,467,948 B2 | 12/2008 | Lindberg et al. |
| 7,499,216 B2 | 3/2009 | Niv et al. |
| 7,503,684 B2 | 3/2009 | Ueno et al. |
| 7,509,042 B2 | 3/2009 | Mori et al. |
| 7,513,627 B2 | 4/2009 | Larson et al. |
| 7,515,143 B2 | 4/2009 | Keam et al. |
| 7,528,337 B2 | 5/2009 | Tanabe et al. |
| 7,528,374 B2 | 5/2009 | Smitt et al. |
| 7,532,227 B2 | 5/2009 | Nakajima et al. |
| 7,545,429 B2 | 6/2009 | Travis |
| 7,561,131 B2 | 7/2009 | Ijzerman et al. |
| 7,572,045 B2 | 8/2009 | Hoelen et al. |
| RE40,891 E | 9/2009 | Yasutake |
| 7,612,882 B2 | 11/2009 | Wu et al. |
| 7,620,244 B1 | 11/2009 | Collier |
| 7,623,121 B2 | 11/2009 | Dodge |
| 7,626,358 B2 | 12/2009 | Lam et al. |
| 7,626,582 B1 | 12/2009 | Nicolas et al. |
| 7,631,327 B2 | 12/2009 | Dempski et al. |
| 7,643,213 B2 | 1/2010 | Boettiger et al. |
| 7,660,047 B1 | 2/2010 | Travis et al. |
| 7,675,598 B2 | 3/2010 | Hong |
| 7,686,066 B2 | 3/2010 | Hirao |
| 7,705,558 B2 | 4/2010 | Silverman |
| 7,715,187 B2 | 5/2010 | Hotelling et al. |
| 7,716,003 B1 | 5/2010 | Wack et al. |
| 7,719,769 B2 | 5/2010 | Sugihara et al. |
| 7,722,792 B2 | 5/2010 | Uezaki et al. |
| 7,724,952 B2 | 5/2010 | Shum et al. |
| 7,728,923 B2 | 6/2010 | Kim et al. |
| 7,728,933 B2 | 6/2010 | Kim et al. |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,775,567 B2 | 8/2010 | Ligtenberg et al. |
| 7,782,341 B2 | 8/2010 | Kothandaraman |
| 7,788,474 B2 | 8/2010 | Switzer et al. |
| 7,800,708 B2 | 9/2010 | Brott et al. |
| 7,815,358 B2 | 10/2010 | Inditsky |
| 7,826,508 B2 | 11/2010 | Reid et al. |
| 7,844,985 B2 | 11/2010 | Hendricks et al. |
| 7,852,621 B2 | 12/2010 | Lin et al. |
| 7,855,716 B2 | 12/2010 | McCreary et al. |
| 7,871,811 B2 | 1/2011 | Fang et al. |
| 7,890,882 B1 | 2/2011 | Nelson |
| 7,898,797 B2 | 3/2011 | Fan et al. |
| 7,904,832 B2 | 3/2011 | Ubillos |
| 7,918,559 B2 | 4/2011 | Tesar |
| 7,927,654 B2 | 4/2011 | Hagood et al. |
| 7,936,501 B2 | 5/2011 | Smith et al. |
| 7,957,082 B2 | 6/2011 | Mi et al. |
| 7,965,268 B2 | 6/2011 | Gass et al. |
| 7,967,462 B2 | 6/2011 | Ogiro et al. |
| 7,970,246 B2 | 6/2011 | Travis et al. |
| 7,991,257 B1 | 8/2011 | Coleman |
| 8,007,158 B2 | 8/2011 | Woo et al. |
| 8,014,644 B2 | 9/2011 | Morimoto et al. |
| 8,018,579 B1 | 9/2011 | Krah |
| 8,026,904 B2 | 9/2011 | Westerman |
| 8,035,614 B2 | 10/2011 | Bell et al. |
| 8,035,624 B2 | 10/2011 | Bell et al. |
| 8,059,391 B2 | 11/2011 | Chang et al. |
| RE42,992 E | 12/2011 | David |
| 8,077,160 B2 | 12/2011 | Land et al. |
| 8,102,362 B2 | 1/2012 | Ricks et al. |
| 8,115,718 B2 | 2/2012 | Chen et al. |
| 8,128,800 B2 | 3/2012 | Seo et al. |
| 8,149,272 B2 | 4/2012 | Evans et al. |
| 8,150,893 B2 | 4/2012 | Bohannon et al. |
| 8,162,524 B2 | 4/2012 | Van Ostrand et al. |
| 8,165,988 B2 | 4/2012 | Shau et al. |
| 8,169,185 B2 | 5/2012 | Partovi et al. |
| 8,176,436 B2 | 5/2012 | Arend et al. |
| 8,179,236 B2 | 5/2012 | Weller et al. |
| 8,184,190 B2 | 5/2012 | Dosluoglu |
| 8,189,973 B2 | 5/2012 | Travis et al. |
| 8,220,929 B2 | 7/2012 | Miyawaki et al. |
| 8,223,489 B2 | 7/2012 | Shih |
| 8,240,007 B2 | 8/2012 | Duan et al. |
| 8,243,027 B2 | 8/2012 | Hotelling et al. |
| 8,244,667 B1 | 8/2012 | Weinberger et al. |
| 8,245,354 B2 | 8/2012 | Duan et al. |
| 8,246,170 B2 | 8/2012 | Yamamoto et al. |
| 8,249,263 B2 | 8/2012 | Cragun |
| 8,251,563 B2 | 8/2012 | Papakonstantinou et al. |
| 8,259,091 B2 | 9/2012 | Yeh |
| 8,263,730 B2 | 9/2012 | Shimizu |
| 8,310,508 B2 | 11/2012 | Hekstra et al. |
| 8,310,768 B2 | 11/2012 | Lin et al. |
| 8,325,416 B2 | 12/2012 | Lesage et al. |
| 8,332,402 B2 | 12/2012 | Forstall et al. |
| 8,342,857 B2 | 1/2013 | Palli et al. |
| 8,345,920 B2 | 1/2013 | Ferren et al. |
| 8,354,806 B2 | 1/2013 | Travis et al. |
| 8,358,400 B2 | 1/2013 | Escuti |
| 8,362,975 B2 | 1/2013 | Uehara |
| 8,363,036 B2 | 1/2013 | Liang |
| 8,371,174 B2 | 2/2013 | Chen et al. |

(56) References Cited

U.S. PATENT DOCUMENTS

| | | | |
|---|---|---|---|
| 8,387,078 B2 * | 2/2013 | Memmott | G06F 1/3209 719/330 |
| 8,389,078 B2 | 3/2013 | Lin et al. | |
| 8,416,206 B2 | 4/2013 | Carpendale et al. | |
| 8,421,757 B2 | 4/2013 | Suzuki et al. | |
| 8,434,019 B2 | 4/2013 | Nelson | |
| 8,466,902 B2 | 6/2013 | Boer et al. | |
| 8,466,954 B2 | 6/2013 | Ko et al. | |
| 8,467,133 B2 | 6/2013 | Miller | |
| 8,472,119 B1 | 6/2013 | Kelly | |
| 8,497,657 B2 | 7/2013 | Franks et al. | |
| 8,513,547 B2 | 8/2013 | Ooi | |
| 8,515,501 B2 | 8/2013 | Lee et al. | |
| 8,526,993 B2 | 9/2013 | Bria et al. | |
| 8,538,351 B2 | 9/2013 | Wilson et al. | |
| 8,565,560 B2 | 10/2013 | Popovich et al. | |
| 8,571,539 B1 | 10/2013 | Ranganathan et al. | |
| 8,576,143 B1 | 11/2013 | Kelly | |
| 8,582,206 B2 | 11/2013 | Travis | |
| 8,582,280 B2 | 11/2013 | Ryu | |
| 8,589,341 B2 | 11/2013 | Golde et al. | |
| 8,594,702 B2 | 11/2013 | Naaman et al. | |
| 8,596,881 B2 | 12/2013 | Umeno | |
| 8,600,120 B2 | 12/2013 | Gonion et al. | |
| 8,600,526 B2 | 12/2013 | Nielsen et al. | |
| 8,627,228 B2 | 1/2014 | Yosef et al. | |
| 8,629,815 B2 | 1/2014 | Brin et al. | |
| 8,654,030 B1 | 2/2014 | Mercer | |
| 8,692,212 B1 | 4/2014 | Craft | |
| 8,698,845 B2 | 4/2014 | Lemay | |
| 8,700,931 B2 | 4/2014 | Gudlavenkatasiva et al. | |
| 8,705,229 B2 | 4/2014 | Ashcraft et al. | |
| 8,717,664 B2 | 5/2014 | Wang et al. | |
| 8,723,842 B2 | 5/2014 | Kaneda et al. | |
| 8,738,090 B2 | 5/2014 | Kanda et al. | |
| 8,749,529 B2 | 6/2014 | Powell et al. | |
| 8,769,431 B1 | 7/2014 | Prasad | |
| 8,786,767 B2 | 7/2014 | Rihn et al. | |
| 8,922,996 B2 | 12/2014 | Yeh et al. | |
| 8,947,353 B2 | 2/2015 | Boulanger et al. | |
| 8,952,892 B2 | 2/2015 | Chai | |
| 8,964,379 B2 | 2/2015 | Rihn et al. | |
| 8,991,473 B2 | 3/2015 | Bornemann et al. | |
| 9,001,028 B2 | 4/2015 | Baker | |
| 9,019,615 B2 | 4/2015 | Travis | |
| 9,027,631 B2 | 5/2015 | Bornemann et al. | |
| 9,052,414 B2 | 6/2015 | Travis et al. | |
| 9,063,693 B2 | 6/2015 | Raken et al. | |
| 9,111,703 B2 | 8/2015 | Whit et al. | |
| 9,152,173 B2 | 10/2015 | Lee et al. | |
| 9,189,428 B2 | 11/2015 | Pollmann et al. | |
| 9,201,185 B2 | 12/2015 | Large | |
| 9,360,893 B2 | 6/2016 | Bathiche et al. | |
| 9,426,905 B2 | 8/2016 | Bathiche et al. | |
| 9,519,591 B2 | 12/2016 | Lomet et al. | |
| 9,706,089 B2 | 7/2017 | Beck et al. | |
| 9,793,073 B2 | 10/2017 | Marwah et al. | |
| 9,852,855 B2 | 12/2017 | Shaw et al. | |
| 9,904,327 B2 | 2/2018 | Whit et al. | |
| 2001/0020455 A1 | 9/2001 | Schifferl | |
| 2002/0008854 A1 | 1/2002 | Leigh Travis | |
| 2002/0035455 A1 | 3/2002 | Niu et al. | |
| 2002/0038196 A1 | 3/2002 | Johnson et al. | |
| 2002/0093436 A1 | 7/2002 | Lien | |
| 2002/0103616 A1 | 8/2002 | Park et al. | |
| 2002/0113882 A1 | 8/2002 | Pollard et al. | |
| 2002/0138772 A1 | 9/2002 | Crawford et al. | |
| 2002/0163510 A1 | 11/2002 | Williams et al. | |
| 2002/0171939 A1 | 11/2002 | Song | |
| 2002/0190823 A1 | 12/2002 | Yap | |
| 2002/0191028 A1 | 12/2002 | Senechalle et al. | |
| 2003/0009518 A1 | 1/2003 | Harrow et al. | |
| 2003/0016282 A1 | 1/2003 | Koizumi | |
| 2003/0036365 A1 | 2/2003 | Kuroda | |
| 2003/0128285 A1 | 7/2003 | Itoh | |
| 2003/0137706 A1 | 7/2003 | Rmanujam et al. | |
| 2003/0137821 A1 | 7/2003 | Gotoh et al. | |
| 2003/0148740 A1 | 8/2003 | Yau et al. | |
| 2003/0163611 A1 * | 8/2003 | Nagao | G06F 9/4411 710/10 |
| 2003/0165017 A1 | 9/2003 | Amitai | |
| 2003/0173195 A1 | 9/2003 | Federspiel | |
| 2003/0179453 A1 | 9/2003 | Mori et al. | |
| 2003/0195937 A1 | 10/2003 | Kircher et al. | |
| 2003/0197806 A1 | 10/2003 | Perry et al. | |
| 2003/0198008 A1 | 10/2003 | Leapman et al. | |
| 2004/0042724 A1 | 3/2004 | Gombert et al. | |
| 2004/0048941 A1 | 3/2004 | Raffel et al. | |
| 2004/0052506 A1 | 3/2004 | Togino | |
| 2004/0100457 A1 | 5/2004 | Mandle | |
| 2004/0115994 A1 | 6/2004 | Wulff et al. | |
| 2004/0151466 A1 | 8/2004 | Crossman-bosworth et al. | |
| 2004/0174709 A1 | 9/2004 | Buelow et al. | |
| 2004/0189822 A1 | 9/2004 | Shimada | |
| 2004/0209489 A1 | 10/2004 | Clapper | |
| 2004/0212553 A1 | 10/2004 | Wang et al. | |
| 2004/0231969 A1 | 11/2004 | Kitano et al. | |
| 2004/0267323 A1 | 12/2004 | Dupelle | |
| 2005/0001957 A1 | 1/2005 | Amimori et al. | |
| 2005/0002073 A1 | 1/2005 | Nakamura et al. | |
| 2005/0042013 A1 | 2/2005 | Lee | |
| 2005/0064765 A1 | 3/2005 | Simpson et al. | |
| 2005/0068460 A1 | 3/2005 | Lin | |
| 2005/0084212 A1 | 4/2005 | Fein | |
| 2005/0094895 A1 | 5/2005 | Baron | |
| 2005/0100272 A1 | 5/2005 | Gilman | |
| 2005/0100690 A1 | 5/2005 | Mayer et al. | |
| 2005/0157459 A1 | 7/2005 | Yin et al. | |
| 2005/0231156 A1 | 10/2005 | Yan | |
| 2005/0265035 A1 | 12/2005 | Brass et al. | |
| 2005/0285703 A1 | 12/2005 | Wheeler et al. | |
| 2006/0002101 A1 | 1/2006 | Wheatley et al. | |
| 2006/0007645 A1 | 1/2006 | Chen et al. | |
| 2006/0010400 A1 | 1/2006 | Dehlin et al. | |
| 2006/0012767 A1 | 1/2006 | Komatsuda et al. | |
| 2006/0020903 A1 | 1/2006 | Wang et al. | |
| 2006/0028400 A1 | 2/2006 | Lapstun et al. | |
| 2006/0028838 A1 | 2/2006 | Imade | |
| 2006/0030295 A1 | 2/2006 | Adams et al. | |
| 2006/0049993 A1 | 3/2006 | Lin et al. | |
| 2006/0061555 A1 | 3/2006 | Mullen | |
| 2006/0061597 A1 | 3/2006 | Hui | |
| 2006/0070384 A1 | 4/2006 | Ertel | |
| 2006/0082973 A1 | 4/2006 | Egbert et al. | |
| 2006/0083004 A1 | 4/2006 | Cok | |
| 2006/0089171 A1 | 4/2006 | Yoo et al. | |
| 2006/0092379 A1 | 5/2006 | Cho et al. | |
| 2006/0102914 A1 | 5/2006 | Smits et al. | |
| 2006/0110537 A1 | 5/2006 | Huang et al. | |
| 2006/0132423 A1 | 6/2006 | Travis | |
| 2006/0132914 A1 | 6/2006 | Weiss et al. | |
| 2006/0146573 A1 | 7/2006 | Iwauchi et al. | |
| 2006/0152499 A1 | 7/2006 | Roberts | |
| 2006/0183331 A1 | 8/2006 | Hofmann | |
| 2006/0197755 A1 | 9/2006 | Bawany | |
| 2006/0215244 A1 | 9/2006 | Yosha et al. | |
| 2006/0221448 A1 | 10/2006 | Nivon et al. | |
| 2006/0227393 A1 | 10/2006 | Herloski | |
| 2006/0228073 A1 | 10/2006 | Mukawa et al. | |
| 2006/0238550 A1 | 10/2006 | Page | |
| 2006/0239006 A1 | 10/2006 | Chaves et al. | |
| 2006/0250381 A1 | 11/2006 | Geaghan | |
| 2006/0254042 A1 | 11/2006 | Chou et al. | |
| 2006/0261778 A1 | 11/2006 | Elizalde Rodarte | |
| 2006/0262185 A1 | 11/2006 | Cha et al. | |
| 2006/0276221 A1 | 12/2006 | Lagnado et al. | |
| 2006/0279501 A1 | 12/2006 | Lu et al. | |
| 2007/0002587 A1 | 1/2007 | Miyashita | |
| 2007/0019181 A1 | 1/2007 | Sinclair et al. | |
| 2007/0024742 A1 | 2/2007 | Raskar et al. | |
| 2007/0046625 A1 | 3/2007 | Yee | |
| 2007/0047221 A1 | 3/2007 | Park | |
| 2007/0047260 A1 | 3/2007 | Lee et al. | |
| 2007/0051766 A1 | 3/2007 | Spencer | |

(56) References Cited

U.S. PATENT DOCUMENTS

| | | |
|---|---|---|
| 2007/0076434 A1 | 4/2007 | Uehara et al. |
| 2007/0080813 A1 | 4/2007 | Melvin |
| 2007/0081091 A1 | 4/2007 | Pan et al. |
| 2007/0091638 A1 | 4/2007 | Ijzerman et al. |
| 2007/0114967 A1 | 5/2007 | Peng |
| 2007/0116929 A1 | 5/2007 | Fujimori et al. |
| 2007/0122027 A1 | 5/2007 | Kunita et al. |
| 2007/0126393 A1 | 6/2007 | Bersenev |
| 2007/0133156 A1 | 6/2007 | Ligtenberg et al. |
| 2007/0161262 A1 | 7/2007 | Lloyd |
| 2007/0188478 A1 | 8/2007 | Silverstein et al. |
| 2007/0189667 A1 | 8/2007 | Wakita et al. |
| 2007/0194752 A1 | 8/2007 | Mcburney |
| 2007/0201246 A1 | 8/2007 | Yeo et al. |
| 2007/0201859 A1 | 8/2007 | Sarrat |
| 2007/0217224 A1 | 9/2007 | Kao et al. |
| 2007/0223248 A1 | 9/2007 | Han |
| 2007/0236467 A1 | 10/2007 | Marshall et al. |
| 2007/0247800 A1 | 10/2007 | Smith et al. |
| 2007/0252827 A1 | 11/2007 | Hirota |
| 2007/0263119 A1 | 11/2007 | Shum et al. |
| 2007/0271527 A1 | 11/2007 | Paas et al. |
| 2007/0274094 A1 | 11/2007 | Schultz et al. |
| 2007/0274095 A1 | 11/2007 | Destain |
| 2007/0274099 A1 | 11/2007 | Tai et al. |
| 2007/0279744 A1 | 12/2007 | Fujimoto |
| 2008/0002350 A1 | 1/2008 | Farrugia |
| 2008/0013809 A1 | 1/2008 | Zhu et al. |
| 2008/0014534 A1 | 1/2008 | Barwicz et al. |
| 2008/0019150 A1 | 1/2008 | Park et al. |
| 2008/0019684 A1 | 1/2008 | Shyu et al. |
| 2008/0025350 A1 | 1/2008 | Arbore et al. |
| 2008/0030937 A1 | 2/2008 | Russo et al. |
| 2008/0037284 A1 | 2/2008 | Rudisill |
| 2008/0049704 A1 | 2/2008 | Witteman et al. |
| 2008/0061565 A1 | 3/2008 | Lee et al. |
| 2008/0068451 A1 | 3/2008 | Hyatt |
| 2008/0080166 A1 | 4/2008 | Duong et al. |
| 2008/0083127 A1 | 4/2008 | Mcmurtry et al. |
| 2008/0084499 A1 | 4/2008 | Kisacanin et al. |
| 2008/0088593 A1 | 4/2008 | Smoot |
| 2008/0090626 A1 | 4/2008 | Griffin et al. |
| 2008/0094398 A1 | 4/2008 | Ng et al. |
| 2008/0106592 A1 | 5/2008 | Mikami |
| 2008/0111518 A1 | 5/2008 | Toya |
| 2008/0122803 A1 | 5/2008 | Izadi et al. |
| 2008/0150913 A1 | 6/2008 | Bell et al. |
| 2008/0158189 A1 | 7/2008 | Kim |
| 2008/0167832 A1 | 7/2008 | Soss |
| 2008/0177185 A1 | 7/2008 | Nakao et al. |
| 2008/0179507 A2 | 7/2008 | Han |
| 2008/0180411 A1 | 7/2008 | Solomon et al. |
| 2008/0182622 A1 | 7/2008 | Makarowski et al. |
| 2008/0203277 A1 | 8/2008 | Warszauer et al. |
| 2008/0211787 A1 | 9/2008 | Nakao et al. |
| 2008/0219025 A1 | 9/2008 | Spitzer et al. |
| 2008/0225205 A1 | 9/2008 | Travis |
| 2008/0232061 A1 | 9/2008 | Wang et al. |
| 2008/0233326 A1 | 9/2008 | Hegemier et al. |
| 2008/0258679 A1 | 10/2008 | Manico et al. |
| 2008/0297878 A1 | 12/2008 | Brown et al. |
| 2008/0303479 A1 | 12/2008 | Park et al. |
| 2008/0316768 A1 | 12/2008 | Travis |
| 2008/0318008 A1 | 12/2008 | Wielstra et al. |
| 2009/0013275 A1 | 1/2009 | May et al. |
| 2009/0033623 A1 | 2/2009 | Lin |
| 2009/0040426 A1 | 2/2009 | Mather et al. |
| 2009/0044113 A1 | 2/2009 | Jones et al. |
| 2009/0067156 A1 | 3/2009 | Bonnett et al. |
| 2009/0073060 A1 | 3/2009 | Shimasaki et al. |
| 2009/0079639 A1 | 3/2009 | Hotta et al. |
| 2009/0083710 A1 | 3/2009 | Best et al. |
| 2009/0085515 A1 | 4/2009 | Bourilkov et al. |
| 2009/0096738 A1 | 4/2009 | Chen et al. |
| 2009/0102419 A1 | 4/2009 | Gwon et al. |
| 2009/0102794 A1 | 4/2009 | Lapstun et al. |
| 2009/0127005 A1 | 5/2009 | Zachut et al. |
| 2009/0134838 A1 | 5/2009 | Raghuprasad |
| 2009/0141439 A1 | 6/2009 | Moser |
| 2009/0142020 A1 | 6/2009 | Van ostrand et al. |
| 2009/0146975 A1 | 6/2009 | Chang |
| 2009/0146992 A1 | 6/2009 | Fukunaga et al. |
| 2009/0147102 A1 | 6/2009 | Kakinuma et al. |
| 2009/0152748 A1 | 6/2009 | Wang et al. |
| 2009/0160944 A1 | 6/2009 | Trevelyan et al. |
| 2009/0161385 A1 | 6/2009 | Parker et al. |
| 2009/0163147 A1 | 6/2009 | Steigerwald et al. |
| 2009/0167718 A1 | 7/2009 | Lee et al. |
| 2009/0167728 A1 | 7/2009 | Geaghan et al. |
| 2009/0167930 A1 | 7/2009 | Safaee-rad et al. |
| 2009/0174687 A1 | 7/2009 | Ciesla et al. |
| 2009/0187860 A1 | 7/2009 | Fleck et al. |
| 2009/0189974 A1 | 7/2009 | Deering |
| 2009/0200384 A1 | 8/2009 | Masalkar |
| 2009/0224416 A1 | 9/2009 | Laakkonen et al. |
| 2009/0231465 A1 | 9/2009 | Senba |
| 2009/0246707 A1 | 10/2009 | Li et al. |
| 2009/0251623 A1 | 10/2009 | Koyama |
| 2009/0268386 A1 | 10/2009 | Lin |
| 2009/0269943 A1 | 10/2009 | Palli et al. |
| 2009/0276734 A1 | 11/2009 | Taylor et al. |
| 2009/0284613 A1 | 11/2009 | Kim |
| 2009/0295648 A1 | 12/2009 | Dorsey et al. |
| 2009/0303137 A1 | 12/2009 | Kusaka et al. |
| 2009/0316072 A1 | 12/2009 | Okumura et al. |
| 2009/0317595 A1 | 12/2009 | Brehm et al. |
| 2009/0322278 A1 | 12/2009 | Franks et al. |
| 2010/0013738 A1 | 1/2010 | Covannon et al. |
| 2010/0021022 A1 | 1/2010 | Pittel et al. |
| 2010/0021108 A1 | 1/2010 | Kang et al. |
| 2010/0045540 A1 | 2/2010 | Lai et al. |
| 2010/0045609 A1 | 2/2010 | Do et al. |
| 2010/0051356 A1 | 3/2010 | Stern et al. |
| 2010/0053771 A1 | 3/2010 | Travis et al. |
| 2010/0072351 A1 | 3/2010 | Mahowald |
| 2010/0074291 A1 | 3/2010 | Nakamura |
| 2010/0075517 A1 | 3/2010 | Ni et al. |
| 2010/0078328 A1 | 4/2010 | Mandler et al. |
| 2010/0079861 A1 | 4/2010 | Powell |
| 2010/0081377 A1 | 4/2010 | Chatterjee et al. |
| 2010/0102206 A1 | 4/2010 | Cazaux et al. |
| 2010/0103332 A1 | 4/2010 | Li et al. |
| 2010/0103611 A1 | 4/2010 | Yang et al. |
| 2010/0128112 A1 | 5/2010 | Marti et al. |
| 2010/0135036 A1 | 6/2010 | Matsuba et al. |
| 2010/0144406 A1 | 6/2010 | Ozawa |
| 2010/0149073 A1 | 6/2010 | Chaum et al. |
| 2010/0149100 A1 | 6/2010 | Meiby |
| 2010/0149117 A1 | 6/2010 | Chien et al. |
| 2010/0149134 A1 | 6/2010 | Westerman et al. |
| 2010/0154171 A1 | 6/2010 | Lombardi et al. |
| 2010/0156798 A1 | 6/2010 | Archer |
| 2010/0157085 A1 | 6/2010 | Sasaki |
| 2010/0159995 A1 | 6/2010 | Stallings et al. |
| 2010/0171875 A1 | 7/2010 | Yamamoto |
| 2010/0177388 A1 | 7/2010 | Cohen et al. |
| 2010/0201953 A1 | 8/2010 | Freeman et al. |
| 2010/0206644 A1 | 8/2010 | Yeh |
| 2010/0214214 A1 | 8/2010 | Corson et al. |
| 2010/0214257 A1 | 8/2010 | Wussler et al. |
| 2010/0214659 A1 | 8/2010 | Levola |
| 2010/0231498 A1 | 9/2010 | Large et al. |
| 2010/0231510 A1 | 9/2010 | Sampsell et al. |
| 2010/0237970 A1 | 9/2010 | Liu |
| 2010/0238075 A1 | 9/2010 | Pourseyed |
| 2010/0238138 A1 | 9/2010 | Goertz et al. |
| 2010/0238270 A1 | 9/2010 | Bjelkhagen et al. |
| 2010/0238320 A1 | 9/2010 | Washisu |
| 2010/0245221 A1 | 9/2010 | Khan |
| 2010/0245289 A1 | 9/2010 | Svajda |
| 2010/0274932 A1* | 10/2010 | Kose ............... G06F 3/03543 710/19 |
| 2010/0282953 A1 | 11/2010 | Tam |
| 2010/0284085 A1 | 11/2010 | Laakkonen |

(56) References Cited

U.S. PATENT DOCUMENTS

| | | |
|---|---|---|
| 2010/0291331 A1 | 11/2010 | Schaefer |
| 2010/0296163 A1 | 11/2010 | Saarikko |
| 2010/0299642 A1 | 11/2010 | Merrell et al. |
| 2010/0302469 A1 | 12/2010 | Yue et al. |
| 2010/0304793 A1 | 12/2010 | Kim et al. |
| 2010/0315774 A1 | 12/2010 | Walker et al. |
| 2010/0321339 A1 | 12/2010 | Kimmel |
| 2010/0321482 A1 | 12/2010 | Cleveland |
| 2010/0322479 A1 | 12/2010 | Cleveland |
| 2010/0331059 A1 | 12/2010 | Apgar et al. |
| 2011/0002577 A1 | 1/2011 | Van Ostrand |
| 2011/0007047 A1 | 1/2011 | Fujioka et al. |
| 2011/0012866 A1 | 1/2011 | Keam |
| 2011/0018799 A1 | 1/2011 | Lin |
| 2011/0032215 A1 | 2/2011 | Sirotich et al. |
| 2011/0035209 A1 | 2/2011 | Macfarlane |
| 2011/0043142 A1 | 2/2011 | Travis et al. |
| 2011/0043479 A1 | 2/2011 | van aerle et al. |
| 2011/0044579 A1 | 2/2011 | Travis et al. |
| 2011/0044582 A1 | 2/2011 | Travis et al. |
| 2011/0045317 A1 | 2/2011 | Hao et al. |
| 2011/0048754 A1 | 3/2011 | Xiong et al. |
| 2011/0050946 A1 | 3/2011 | Lee et al. |
| 2011/0072391 A1 | 3/2011 | Hanggie et al. |
| 2011/0074702 A1 | 3/2011 | Pertuit et al. |
| 2011/0075440 A1 | 3/2011 | Wang |
| 2011/0080367 A1 | 4/2011 | Marchand et al. |
| 2011/0081946 A1 | 4/2011 | Singh |
| 2011/0096035 A1 | 4/2011 | Shen |
| 2011/0099512 A1 | 4/2011 | Jeong |
| 2011/0102356 A1 | 5/2011 | Kemppinen et al. |
| 2011/0115747 A1 | 5/2011 | Powell et al. |
| 2011/0119597 A1 | 5/2011 | Yellamraju et al. |
| 2011/0122071 A1 | 5/2011 | Powell |
| 2011/0134017 A1 | 6/2011 | Burke |
| 2011/0134112 A1 | 6/2011 | Koh et al. |
| 2011/0134161 A1 | 6/2011 | Son et al. |
| 2011/0157101 A1 | 6/2011 | Chang |
| 2011/0167992 A1 | 7/2011 | Eventoff et al. |
| 2011/0169778 A1 | 7/2011 | Nungester et al. |
| 2011/0170289 A1 | 7/2011 | Allen et al. |
| 2011/0181754 A1 | 7/2011 | Iwasaki |
| 2011/0183120 A1 | 7/2011 | Sharygin et al. |
| 2011/0193938 A1 | 8/2011 | Oderwald et al. |
| 2011/0197156 A1 | 8/2011 | Strait et al. |
| 2011/0202878 A1 | 8/2011 | Park et al. |
| 2011/0216039 A1 | 9/2011 | Chen et al. |
| 2011/0216266 A1 | 9/2011 | Travis |
| 2011/0221659 A1 | 9/2011 | King et al. |
| 2011/0228462 A1 | 9/2011 | Dang |
| 2011/0234535 A1 | 9/2011 | Hung et al. |
| 2011/0234881 A1 | 9/2011 | Wakabayashi et al. |
| 2011/0235179 A1 | 9/2011 | Simmonds |
| 2011/0242063 A1 | 10/2011 | Li et al. |
| 2011/0242138 A1 | 10/2011 | Tribble |
| 2011/0242298 A1 | 10/2011 | Bathiche et al. |
| 2011/0242440 A1 | 10/2011 | Noma et al. |
| 2011/0242670 A1 | 10/2011 | Simmonds |
| 2011/0261083 A1 | 10/2011 | Wilson |
| 2011/0261209 A1 | 10/2011 | Wu |
| 2011/0262001 A1 | 10/2011 | Bi et al. |
| 2011/0284420 A1 | 11/2011 | Sajid |
| 2011/0291993 A1 | 12/2011 | Miyazaki et al. |
| 2011/0304815 A1 | 12/2011 | Newell |
| 2011/0317399 A1 | 12/2011 | Hsu |
| 2012/0002052 A1 | 1/2012 | Muramatsu et al. |
| 2012/0008015 A1 | 1/2012 | Manabe |
| 2012/0011462 A1 | 1/2012 | Westerman et al. |
| 2012/0013490 A1 | 1/2012 | Pance |
| 2012/0013519 A1 | 1/2012 | Hakansson et al. |
| 2012/0019165 A1 | 1/2012 | Igaki et al. |
| 2012/0019445 A1 | 1/2012 | Liu |
| 2012/0019686 A1 | 1/2012 | Manabe |
| 2012/0020019 A1 | 1/2012 | Chen et al. |
| 2012/0020112 A1 | 1/2012 | Fisher et al. |
| 2012/0020556 A1 | 1/2012 | Manabe |
| 2012/0021618 A1 | 1/2012 | Schultz |
| 2012/0026048 A1 | 2/2012 | Vazquez et al. |
| 2012/0030616 A1 | 2/2012 | Howes et al. |
| 2012/0033306 A1 | 2/2012 | Valera et al. |
| 2012/0033369 A1 | 2/2012 | Wu et al. |
| 2012/0041721 A1 | 2/2012 | Chen |
| 2012/0044140 A1 | 2/2012 | Koyama et al. |
| 2012/0044379 A1 | 2/2012 | Manabe |
| 2012/0054674 A1 | 3/2012 | Beykpour et al. |
| 2012/0062736 A1 | 3/2012 | Xiong |
| 2012/0062850 A1 | 3/2012 | Travis |
| 2012/0062998 A1 | 3/2012 | Schultz et al. |
| 2012/0069413 A1 | 3/2012 | Schultz |
| 2012/0071008 A1 | 3/2012 | Sessford |
| 2012/0075256 A1 | 3/2012 | Izadi et al. |
| 2012/0081316 A1 | 4/2012 | Sirpal et al. |
| 2012/0084710 A1 | 4/2012 | Sirpal et al. |
| 2012/0087078 A1 | 4/2012 | Medica et al. |
| 2012/0098872 A1 | 4/2012 | Kim et al. |
| 2012/0102436 A1 | 4/2012 | Nurmi |
| 2012/0102438 A1 | 4/2012 | Robinson et al. |
| 2012/0103778 A1 | 5/2012 | Obata et al. |
| 2012/0105321 A1 | 5/2012 | Wang et al. |
| 2012/0105481 A1 | 5/2012 | Baek et al. |
| 2012/0113031 A1 | 5/2012 | Lee et al. |
| 2012/0113223 A1 | 5/2012 | Hilliges et al. |
| 2012/0115553 A1 | 5/2012 | Mahe et al. |
| 2012/0120493 A1 | 5/2012 | Simmonds et al. |
| 2012/0126445 A1 | 5/2012 | Rasmussen et al. |
| 2012/0127573 A1 | 5/2012 | Robinson et al. |
| 2012/0133561 A1 | 5/2012 | Konanur et al. |
| 2012/0133797 A1 | 5/2012 | Sato et al. |
| 2012/0134623 A1 | 5/2012 | Boudreau et al. |
| 2012/0146863 A1 | 6/2012 | Kwon |
| 2012/0146943 A1 | 6/2012 | Fairley et al. |
| 2012/0161406 A1 | 6/2012 | Mersky |
| 2012/0162088 A1 | 6/2012 | van Lieshout et al. |
| 2012/0162126 A1 | 6/2012 | Yuan et al. |
| 2012/0166980 A1 | 6/2012 | Yosef et al. |
| 2012/0170284 A1 | 7/2012 | Shedletsky |
| 2012/0176322 A1 | 7/2012 | Karmi et al. |
| 2012/0176474 A1 | 7/2012 | Border |
| 2012/0182743 A1 | 7/2012 | Chou |
| 2012/0185803 A1 | 7/2012 | Wang et al. |
| 2012/0188243 A1 | 7/2012 | Fujii et al. |
| 2012/0188791 A1 | 7/2012 | Voloschenko et al. |
| 2012/0194393 A1 | 8/2012 | Uttermann et al. |
| 2012/0195063 A1 | 8/2012 | Kim et al. |
| 2012/0195553 A1 | 8/2012 | Hasegawa et al. |
| 2012/0200532 A1 | 8/2012 | Powell et al. |
| 2012/0200802 A1 | 8/2012 | Large |
| 2012/0206937 A1 | 8/2012 | Travis et al. |
| 2012/0223866 A1 | 9/2012 | Ayala Vazquez et al. |
| 2012/0227259 A1 | 9/2012 | Badaye et al. |
| 2012/0235635 A1 | 9/2012 | Sato |
| 2012/0235790 A1 | 9/2012 | Zhao et al. |
| 2012/0235885 A1 | 9/2012 | Miller et al. |
| 2012/0242561 A1 | 9/2012 | Sugihara |
| 2012/0243102 A1 | 9/2012 | Takeda et al. |
| 2012/0243165 A1 | 9/2012 | Chang et al. |
| 2012/0243204 A1 | 9/2012 | Robinson |
| 2012/0256848 A1 | 10/2012 | Madabusi Srinivasan |
| 2012/0256929 A1 | 10/2012 | Koenig et al. |
| 2012/0262657 A1 | 10/2012 | Nakanishi et al. |
| 2012/0268912 A1 | 10/2012 | Minami et al. |
| 2012/0278744 A1 | 11/2012 | Kozitsyn et al. |
| 2012/0281129 A1 | 11/2012 | Wang et al. |
| 2012/0284297 A1 | 11/2012 | Aguera-arcas et al. |
| 2012/0287218 A1 | 11/2012 | Ok |
| 2012/0292535 A1 | 11/2012 | Choi et al. |
| 2012/0298491 A1 | 11/2012 | Ozias et al. |
| 2012/0304092 A1 | 11/2012 | Jarrett et al. |
| 2012/0304116 A1 | 11/2012 | Donahue et al. |
| 2012/0323933 A1 | 12/2012 | He et al. |
| 2012/0326003 A1 | 12/2012 | Solow et al. |
| 2012/0330162 A1 | 12/2012 | Rajan et al. |
| 2013/0007665 A1 | 1/2013 | Chaudhri et al. |
| 2013/0016468 A1 | 1/2013 | Oh |

(56) References Cited

U.S. PATENT DOCUMENTS

| | | |
|---|---|---|
| 2013/0017696 A1 | 1/2013 | Alvarez Rivera |
| 2013/0024805 A1 | 1/2013 | In et al. |
| 2013/0027354 A1 | 1/2013 | Yabuta et al. |
| 2013/0027356 A1 | 1/2013 | Nishida |
| 2013/0044059 A1 | 2/2013 | Fu |
| 2013/0050922 A1 | 2/2013 | Lee et al. |
| 2013/0063465 A1 | 3/2013 | Zaman et al. |
| 2013/0069916 A1 | 3/2013 | Esteve |
| 2013/0076635 A1 | 3/2013 | Lin |
| 2013/0082950 A1 | 4/2013 | Lim et al. |
| 2013/0083466 A1 | 4/2013 | Becze et al. |
| 2013/0093388 A1 | 4/2013 | Partovi |
| 2013/0100008 A1 | 4/2013 | Marti et al. |
| 2013/0106592 A1 | 5/2013 | Morgan et al. |
| 2013/0106723 A1 | 5/2013 | Bakken et al. |
| 2013/0106813 A1 | 5/2013 | Hotelling et al. |
| 2013/0107144 A1 | 5/2013 | Marhefka et al. |
| 2013/0107572 A1 | 5/2013 | Holman et al. |
| 2013/0120466 A1 | 5/2013 | Chen et al. |
| 2013/0120760 A1 | 5/2013 | Raguin et al. |
| 2013/0127980 A1 | 5/2013 | Haddick et al. |
| 2013/0128102 A1 | 5/2013 | Yano |
| 2013/0148864 A1 | 6/2013 | Dolson et al. |
| 2013/0155723 A1 | 6/2013 | Coleman |
| 2013/0156080 A1 | 6/2013 | Cheng et al. |
| 2013/0170802 A1 | 7/2013 | Pitwon |
| 2013/0181926 A1 | 7/2013 | Lim |
| 2013/0182246 A1 | 7/2013 | Tanase |
| 2013/0187753 A1 | 7/2013 | Chiriyankandath |
| 2013/0201094 A1 | 8/2013 | Travis et al. |
| 2013/0207896 A1 | 8/2013 | Robinson et al. |
| 2013/0207937 A1 | 8/2013 | Lutian et al. |
| 2013/0216108 A1 | 8/2013 | Hwang et al. |
| 2013/0222353 A1 | 8/2013 | Large |
| 2013/0222681 A1 | 8/2013 | Wan |
| 2013/0228435 A1 | 9/2013 | Whitt et al. |
| 2013/0229356 A1 | 9/2013 | Marwah et al. |
| 2013/0229357 A1 | 9/2013 | Powell et al. |
| 2013/0229386 A1 | 9/2013 | Bathiche et al. |
| 2013/0241860 A1 | 9/2013 | Ciesla et al. |
| 2013/0242495 A1 | 9/2013 | Bathiche et al. |
| 2013/0265220 A1 | 10/2013 | Fleischmann et al. |
| 2013/0283212 A1 | 10/2013 | Zhu et al. |
| 2013/0300684 A1 | 11/2013 | Kim et al. |
| 2013/0305184 A1 | 11/2013 | Kim et al. |
| 2013/0307935 A1 | 11/2013 | Rappel et al. |
| 2013/0308339 A1 | 11/2013 | Woodgate et al. |
| 2013/0328761 A1 | 12/2013 | Boulanger et al. |
| 2013/0329301 A1 | 12/2013 | Travis |
| 2013/0335387 A1 | 12/2013 | Emerton et al. |
| 2013/0335891 A1 | 12/2013 | Chen et al. |
| 2013/0335902 A1 | 12/2013 | Campbell et al. |
| 2013/0335903 A1 | 12/2013 | Raken et al. |
| 2013/0343291 A1 | 12/2013 | Gao et al. |
| 2013/0346725 A1 | 12/2013 | Lomet et al. |
| 2014/0022177 A1 | 1/2014 | Shaw et al. |
| 2014/0022265 A1 | 1/2014 | Canan et al. |
| 2014/0022629 A1 | 1/2014 | Powell |
| 2014/0028635 A1 | 1/2014 | Krah |
| 2014/0029180 A1 | 1/2014 | Nishimura et al. |
| 2014/0029183 A1 | 1/2014 | Ashcraft et al. |
| 2014/0036430 A1 | 2/2014 | Wroblewski et al. |
| 2014/0049894 A1 | 2/2014 | Rihn et al. |
| 2014/0053108 A1 | 2/2014 | Johansson |
| 2014/0055624 A1 | 2/2014 | Gaines et al. |
| 2014/0059139 A1 | 2/2014 | Filev et al. |
| 2014/0063198 A1 | 3/2014 | Boulanger et al. |
| 2014/0063367 A1 | 3/2014 | Yang et al. |
| 2014/0069791 A1 | 3/2014 | Chu et al. |
| 2014/0078063 A1 | 3/2014 | Bathiche et al. |
| 2014/0083883 A1 | 3/2014 | Elias |
| 2014/0086081 A1 | 3/2014 | Mack et al. |
| 2014/0089833 A1 | 3/2014 | Hwang et al. |
| 2014/0092765 A1 | 4/2014 | Agarwal et al. |
| 2014/0098085 A1 | 4/2014 | Lee et al. |
| 2014/0104189 A1 | 4/2014 | Marshall et al. |
| 2014/0104665 A1 | 4/2014 | Popovich et al. |
| 2014/0111865 A1 | 4/2014 | Kobayashi |
| 2014/0116982 A1 | 5/2014 | Schellenberg et al. |
| 2014/0117928 A1 | 5/2014 | Liao |
| 2014/0118241 A1 | 5/2014 | Chai |
| 2014/0123273 A1 | 5/2014 | Matus |
| 2014/0125864 A1 | 5/2014 | Rihn et al. |
| 2014/0131000 A1 | 5/2014 | Bornemann et al. |
| 2014/0132550 A1 | 5/2014 | Mccracken et al. |
| 2014/0133456 A1 | 5/2014 | Donepudi et al. |
| 2014/0135060 A1 | 5/2014 | Mercer |
| 2014/0143247 A1 | 5/2014 | Rathnavelu et al. |
| 2014/0143708 A1 | 5/2014 | Yang et al. |
| 2014/0148170 A1 | 5/2014 | Damp et al. |
| 2014/0153390 A1 | 6/2014 | Ishii et al. |
| 2014/0154523 A1 | 6/2014 | Bornemann et al. |
| 2014/0155031 A1 | 6/2014 | Lee et al. |
| 2014/0155123 A1 | 6/2014 | Lee et al. |
| 2014/0166227 A1 | 6/2014 | Bornemann et al. |
| 2014/0168131 A1 | 6/2014 | Rihn et al. |
| 2014/0194095 A1 | 7/2014 | Wynne et al. |
| 2014/0196143 A1 | 7/2014 | Fliderman et al. |
| 2014/0225821 A1 | 8/2014 | Kim et al. |
| 2014/0233237 A1 | 8/2014 | Lutian |
| 2014/0240842 A1 | 8/2014 | Nguyen et al. |
| 2014/0248506 A1 | 9/2014 | Mccormack et al. |
| 2014/0254032 A1 | 9/2014 | Chen |
| 2014/0258937 A1 | 9/2014 | Lee |
| 2014/0310646 A1 | 10/2014 | Vranjes et al. |
| 2014/0313401 A1 | 10/2014 | Rihn et al. |
| 2014/0314374 A1 | 10/2014 | Fattal et al. |
| 2014/0370937 A1 | 12/2014 | Park et al. |
| 2014/0374230 A1 | 12/2014 | Shaw et al. |
| 2014/0378099 A1 | 12/2014 | Huang et al. |
| 2015/0020122 A1 | 1/2015 | Shin et al. |
| 2015/0026092 A1 | 1/2015 | Abboud et al. |
| 2015/0070119 A1 | 3/2015 | Rihn et al. |
| 2015/0086174 A1 | 3/2015 | Abecassis et al. |
| 2015/0117444 A1 | 4/2015 | Sandblad et al. |
| 2015/0172264 A1 | 6/2015 | Hardy |
| 2015/0185950 A1 | 7/2015 | Watanabe et al. |
| 2015/0212553 A1 | 7/2015 | Park et al. |
| 2015/0243236 A1 | 8/2015 | Jain et al. |
| 2015/0312453 A1 | 10/2015 | Gaines et al. |
| 2015/0317062 A1 | 11/2015 | Jarrett et al. |
| 2016/0034284 A1 | 2/2016 | Won et al. |
| 2016/0034424 A1 | 2/2016 | Won |
| 2016/0037481 A1 | 2/2016 | Won et al. |
| 2016/0090767 A1 | 3/2016 | Park et al. |
| 2016/0170935 A1 | 6/2016 | Drasnin |
| 2016/0306396 A1 | 10/2016 | Bathiche et al. |
| 2018/0246842 A1 | 8/2018 | Drasnin |

FOREIGN PATENT DOCUMENTS

| | | |
|---|---|---|
| CN | 1515937 A | 7/2004 |
| CN | 1603072 A | 4/2005 |
| CN | 1650202 A | 8/2005 |
| CN | 1700072 A | 11/2005 |
| CN | 1904823 A | 1/2007 |
| CN | 1920642 A | 2/2007 |
| CN | 2881760 Y | 3/2007 |
| CN | 101036104 A | 9/2007 |
| CN | 101038401 A | 9/2007 |
| CN | 101105512 A | 1/2008 |
| CN | 101335147 A | 12/2008 |
| CN | 101388482 A | 3/2009 |
| CN | 101473167 A | 7/2009 |
| CN | 101512403 A | 8/2009 |
| CN | 101688991 A | 3/2010 |
| CN | 101889225 A | 11/2010 |
| CN | 101893785 A | 11/2010 |
| CN | 102012772 A | 4/2011 |
| CN | 102047155 A | 5/2011 |
| CN | 202119579 U | 1/2012 |
| CN | 202441167 U | 9/2012 |
| CN | 102778956 A | 11/2012 |
| CN | 102937231 A | 2/2013 |

(56) References Cited

FOREIGN PATENT DOCUMENTS

| | | |
|---|---|---|
| CN | 103455097 A | 12/2013 |
| CN | 103543904 A | 1/2014 |
| DE | 202010005274 U1 | 7/2010 |
| EP | 0271956 A2 | 6/1988 |
| EP | 276048 A1 | 7/1988 |
| EP | 977022 A2 | 2/2000 |
| EP | 1847924 A1 | 10/2007 |
| EP | 2083310 A2 | 7/2009 |
| EP | 2618247 A1 | 7/2013 |
| EP | 2662761 A1 | 11/2013 |
| FR | 2942811 A1 | 9/2010 |
| GB | 1100331 A | 1/1968 |
| GB | 2410116 A | 7/2005 |
| GB | 2428101 A | 1/2007 |
| GB | 2482931 A | 2/2012 |
| GB | 2504944 A | 2/2014 |
| JP | S57126617 U | 8/1982 |
| JP | S5810335 U | 1/1983 |
| JP | S593824 A | 1/1984 |
| JP | S6037923 U | 3/1985 |
| JP | H0245820 U | 2/1990 |
| JP | H03151693 A | 6/1991 |
| JP | H04317899 A | 11/1992 |
| JP | H104540 A | 1/1998 |
| JP | H1078357 A | 3/1998 |
| JP | 10234057 A | 9/1998 |
| JP | H11248557 A | 9/1999 |
| JP | 2000347037 A | 12/2000 |
| JP | 2002100226 A | 4/2002 |
| JP | 2003140775 A | 5/2003 |
| JP | 2003215349 A | 7/2003 |
| JP | 2004138167 A | 5/2004 |
| JP | 2004171948 A | 6/2004 |
| JP | 2004227071 A | 8/2004 |
| JP | 3602207 B2 | 12/2004 |
| JP | 2005071728 A | 3/2005 |
| JP | 2005135694 A | 5/2005 |
| JP | 2005156932 A | 6/2005 |
| JP | 2006004877 A | 1/2006 |
| JP | 2006160155 A | 6/2006 |
| JP | 2006278251 A | 10/2006 |
| JP | 2006310269 A | 11/2006 |
| JP | 2007184286 A | 7/2007 |
| JP | 2007258774 A | 10/2007 |
| JP | 2007273288 A | 10/2007 |
| JP | 2007279577 A | 10/2007 |
| JP | 2008066152 A | 3/2008 |
| JP | 2008529251 A | 7/2008 |
| JP | 2009003053 A | 1/2009 |
| JP | 2009059583 A | 3/2009 |
| JP | 2009222079 A | 10/2009 |
| JP | 2009232326 A | 10/2009 |
| JP | 2010109589 A | 5/2010 |
| JP | 2010151951 A | 7/2010 |
| JP | 2010249305 A | 11/2010 |
| JP | 2012182456 A | 9/2012 |
| JP | 60216479 A | 10/2015 |
| KR | 20040003709 A | 1/2004 |
| KR | 20070001771 A | 1/2007 |
| KR | 20080009490 A | 1/2008 |
| KR | 20090084316 A | 8/2009 |
| KR | 20110064265 A | 6/2011 |
| TW | 201407202 A | 2/2014 |
| WO | 9108915 A1 | 6/1991 |
| WO | 9414587 A2 | 7/1994 |
| WO | 0072079 A2 | 11/2000 |
| WO | 0133282 A1 | 5/2001 |
| WO | 0172037 A1 | 9/2001 |
| WO | 03048635 A1 | 6/2003 |
| WO | 03083530 A1 | 10/2003 |
| WO | 03106134 A1 | 12/2003 |
| WO | 2006054056 A1 | 5/2006 |
| WO | 2006082444 A2 | 8/2006 |
| WO | 2007057500 A1 | 5/2007 |
| WO | 2007094304 A1 | 8/2007 |
| WO | 2007123202 A1 | 11/2007 |
| WO | 2008013146 A1 | 1/2008 |
| WO | 2008038016 A1 | 4/2008 |
| WO | 2009050942 A1 | 4/2009 |
| WO | 2010100360 A1 | 9/2010 |
| WO | 2010147609 A1 | 12/2010 |
| WO | 2011016200 A1 | 2/2011 |
| WO | 2011131978 A1 | 10/2011 |
| WO | 2012063410 A1 | 5/2012 |
| WO | 2012174364 A2 | 12/2012 |
| WO | 2012177811 A1 | 12/2012 |
| WO | 2013012699 A2 | 1/2013 |
| WO | 2013033274 A1 | 3/2013 |
| WO | 2013049908 A1 | 4/2013 |
| WO | 2013163347 A1 | 10/2013 |
| WO | 2014051920 A1 | 4/2014 |
| WO | 2014071308 A1 | 5/2014 |
| WO | 2014084872 A3 | 6/2014 |
| WO | 2014085502 A1 | 6/2014 |
| WO | 2014088343 A1 | 6/2014 |
| WO | 2014130383 A1 | 8/2014 |
| WO | 2014209818 A1 | 12/2014 |

OTHER PUBLICATIONS

Carlon, "How to Add a WhatsApp Widget to your Lock Screen", Retrieved from: http://web.archive.org/web/20140409045447/http://www.androidpit.com/how-to-add-a-whatsapp-widget-to-your-lock-screen, Apr. 29, 2014, 6 Pages.

Chang, et al., "Optical Design and Analysis of LCD Backlight Units Using ASAP", In Optical Engineering Magazine, Jun. 2003, 15 Pages.

Chang-Yen, et al., "A Monolithic PDMS Waveguide System Fabricated Using Soft-Lithography Techniques", In Journal of the Lightwave Technology, vol. 23, No. 6, Jun. 2005, 6 Pages.

Chavan, et al., "Synthesis, Design and Analysis of a Novel Variable Lift Cam Follower System", In Proceedings of International Journal of Design Engineering, vol. 3, Issue 4, Jan. 1, 2010, 1 Page.

Chen, et al., "A Study of Fiber-to-Fiber Losses in Waveguide Grating Routers", In Journal of the Lightwave Technology, vol. 15, No. 10, Oct. 1997, 5 Pages.

Chou, et al., "Imaging and Chromatic Behavior Analysis of a Wedge-Plate Display", In SID Symposium Digest of Technical Papers vol. 37, Issue 1, Jun. 2006, pp. 1031-1034.

Cottier, et al., "Label-free Highly Sensitive Detection of (small) Molecules by Wavelength Interrogation of Integrated Optical Chips", In Proceedings of the Sensors and Actuators B: Chemical, vol. 91, Issue 1-3, Jun. 1, 2003, 11 Pages.

Das, et al., "Study of Heat Transfer through Multilayer Clothing Assemblies: A Theoretical Prediction", In Autex Research Journal, vol. 11, Issue 2, Jun. 2011, 6 Pages.

Dodson, Brian, "New Technology from MIT may Enable Cheap, Color, Holographic Video Displays", Retrieved From: http://newatlas.com/holograph-3d-color-video-display-inexpensive-mit/28029/, Jun. 25, 2013, 8 Pages.

Dumon, et al., "Compact Arrayed Waveguide Grating Devices in Silicon-on-Insulator", In Proceedings of the IEEE/LEOS Symposium Benelux Chapter, Dec. 2005, 4 Pages.

Eckel, Erik, "Personalize Alerts with the Help of OS X Mavericks Notifications", Retrieved from: http://www.techrepublic.com/article/customize-os-x-mavericks-notifications-to-personalize-alerts/, Mar. 10, 2014, 7 Pages.

Gila, et al., "First Results from a Multi-Ion Beam Lithography and Processing System at the University of Florida", In AIP Conference Proceedings, vol. 1336, Issue 1, Jun. 1, 2011, pp. 243-247.

Glendenning, Paul, "Polymer Micro-Optics via Micro Injection Moulding", Retrieved From: https://docplayer.net/48666950-Polymer-micro-optics-via-injection-moulding, Jan. 10, 2011, 6 Pages.

Greiner, et al., "Bandpass Engineering of Lithographically Scribed Channel-Waveguide Bragg Gratings", In Proceedings of the Optics Letters, vol. 29, No. 8, Apr. 15, 2004, 3 Pages.

Grossman, et al., "Multi-Finger Gestural Interaction with 3D Volumetric Displays", In Proceedings of the 17th Annual ACM Symposium on User Interface Software and Technology, Oct. 24, 2004, 10 Pages.

(56) References Cited

OTHER PUBLICATIONS

Harada, et al., "VoiceDraw: A Hands-Free Voice-Driven Drawing Application for People With Motor Impairments", In Proceedings of the 9th international ACM SIGACCESS conference on Computers and accessibility, Oct. 15, 2007, 8 Pages.
Haslam, "This App for Android Customizes your Lock Screen Automatically Depending on Time of Day or Situation", Retrieved from: http://www.redmondpie.com/this-app-for-android-customizes-your-lock-screen-automatically-depending-on-time-of-day-or-situation/, Jun. 1, 2012, 6 Pages.
Henry, Alan, "Supercharge Your Lock Screen with DashClock and These Add-Ons", Retrieved from http://lifehacker.com/supercharge-your-lock-screen-with-dashclock-and-these-a-493206006, May 7, 2013, 12 Pages.
Hua, et al., "Engineering of Head-mounted Projective Displays", In Proceedings of the Applied Optics, vol. 39, Issue 22, Aug. 1, 2000, 11 Pages.
Izadi, et al., "ThinSight: A Thin Form-Factor Interactive Surface Technology", In Journal of Communications of the ACM, vol. 52, No. 12, Dec. 2009, pp. 90-98.
Johnson, Jennifer, "Samsung Galaxy Tab Pro 10.1 Review", Retrieved from: http://hothardware.com/reviews/samsung-galaxy-tab-pro-101-review, Mar. 21, 2014, 10 Pages.
Justin, "Seidio Active with Kickstand for the Galaxy Sill", Retrieved From: https://web.archive.org/web/20130127064225/http://www.t3chniq.com/seidio-active-with-kickstand-gs3/, Jan. 3, 2013, 5 Pages.
Kandogan, et al., "Elastic Windows: Improved Spatial Layout and Rapid Multiple Window Operations", In Proceedings of the Workshop on Advanced Visual Interfaces, May 27, 1996, 10 Pages.
Kaufmann, et al., "Hand Posture Recognition Using Real-time Artificial Evolution", In European Conference on the Applications of Evolutionary Computation, Apr. 7, 2010, 10 Pages.
Kishore, Aseem, "Split or Divide Your Desktop Screen into Multiple Parts", Retrieved from https://web.archive.org/web/20081019203601/http://www.online-tech-tips.com/free-software-downloads/split-or-divide-your-desktop-screen-into-multiple-parts/, Oct. 18, 2008, 7 Pages.
L., et al., "All-Nanoparticle Concave Diffraction Grating Fabricated by Self-Assembly onto Magnetically-Recorded Templates", In Proceedings of the Optical Express, vol. 21, Issue 1, Jan. 14, 2013, 1 Page.
Lahr, Derek, "Development of a Novel Cam-based Infinitely Variable Transmission", In Thesis of Master of Science in Mechanical Engineering, Virginia Polytechnic Institute and State University, Nov. 6, 2009, 91 Pages.
Lanman, et al., "Near-Eye Light Field Displays", In Proceedings of ACM SIGGRAPH Emerging Technologies, Jul. 2013, 10 Pages.
Lee, et al., "Flat-panel Backlight for View-sequential 3D Display", In IEEE Proceedings Optoelectronics—vol. 151. Issue 6, Dec. 2004, 4 Pages.
Lee, et al., "LED Light Coupler Design for a Ultra Thin Light Guide", In Journal of the Optical Society of Korea, vol. 11, Issue 3, Sep. 2007, 5 Pages.
Levandoski, et al., "The Bw-Tree: A B-tree for New Hardware Platforms", In Proceedings of the 29th IEEE International Conference on Data Engineering, Apr. 8, 2013, 12 Pages.
Liu, et al., "Three-dimensional PC: toward novel forms of human-computer interaction", In the Proceedings of Three-Dimensional Video and Display: Devices and Systems vol. CR76, Nov. 5, 2000, 32 Pages.
Ishida, et al., "A Novel Ultra Thin Backlight System without Optical Sheets Using a Newly Developed Multi-Layered Light-guide", In Journal of the Society for Information Display vol. 19, Issue 12, Jul. 5, 2012, 4 Pages.
Ismail, et al., "Improved Arrayed-Waveguide-Grating Layout Avoiding Systematic Phase Errors", In Proceedings of the Optics Express, vol. 19, No. 9, Apr. 25, 2011, 14 Pages.
Iwase, et al. "Multistep Sequential Batch Assembly of Three-Dimensional Ferromagnetic Microstructures with Elastic Hinges", In Journal of Microelectromechanical Systems, vol. 14, Issue 6, Dec. 2005, pp. 1265-1271.
Mack, Eric, "Moto X: The First Two Weeks", Retrieved from: http://www.gizmag.com/two-weeks-motorola-google-moto-x-review/28722/, Aug. 16, 2013, 8 Pages.
Manresa-Yee, et al., "Experiences Using a Hands-Free Interface", In Proceedings of the 10th international ACM SIGACCESS conference on Computers and accessibility, Oct. 13, 2008, pp. 261-262.
McLellan, Charles, "Microsoft Surface Review", http://www.zdnet.com/product/microsoft-surface-rt/, Nov. 6, 2012, 17 Pages.
Mei, et al., "An all fiber interferometric gradient hydrophone with optical path length compensation", In Proceedings of the Summaries of Papers Presented at the Conference on Lasers and Electro-Optics, May 28, 1999, 2 Pages.
Morgan, David P.., et al., "History of Saw Devices", In Proceedings of the IEEE International Frequency Control Symposium, May 27, 1998, 22 Pages.
Muller, Hans, "MultiSplitPane: Splitting Without Nesting", Retrieved from :https://web.archive.org/web/20150511183124/https://today.java.net/pub/a/today/2006/03/23/multi-split-pane.html;, Mar. 23, 2006, 6 Pages.
Nablo, Sam V., "Transfer Coating by Electron Initiated Polymerization", In Proceedings of the 5th International Meeting on Radiation Processing, vol. 25, Issues 4-6, Jan. 1, 1985, 10 Pages.
Nakanishi, et al., "Movable Cameras Enhance Social Telepresence in Media Spaces", In Proceedings of the SIGCHI Conference on Human Factors in Computing Systems, Apr. 4, 2009, pp. 433-442.
Nishizawa, et al., "Investigation of Novel Diffuser Films for 2D Light-Distribution Control", In Proceedings of the IDW, Dec. 2011, 4 Pages.
Odegard, "My iPad MagPad Concept", Retrieved from http://www.pocketables.com/2011/02/my-ipad-magpad-concept.html, Feb. 26, 2011, 8 Pages.
O'Reilly, Dennis, "How to Use the Microsoft Surface Touch Screen and Keyboard", Retrieved from: http://www.cnet.com/how-to/how-to-use-the-microsoft-surface-touch-screen-and-keyboard/, Nov. 6, 2012, 5 Pages.
Patterson, Ben, "iOS 7 Tip: Alerts, Banners, and Badges-What's the Difference?", Retrieved from: http://heresthethingblog.com/2014/01/22/ios-7-tip-whats-difference-alert/, Retrieved on Jan. 22, 2014, 6 Pages.
Paul, Ian, "Three Windows Multitasking Features That Help Maximize Your Screen Space", Retrieved from: https://www.pcworld.com/article/2094124/three-windows-multitasking-features-that-help-maximize-your-screen-space.html, Feb. 4, 2014, 4 Pages.
Peli, Eli, "Visual and Optometric Issues with Head-Mounted Displays", In Proceedings of the IS & T/OSA Optics & Imaging in the Information Age, the Society for Imaging Science and Technology, 1996, pp. 364-369.
Phillips, et al., "Links Between Holography and Lithography", In Proceedings of Fifth International Symposium on Display Holography, Feb. 17, 1995, 9 Pages.
Prohaska, Rich, "Fast Updates with TokuDB", Retrieved from: https://www.percona.com/blog/2013/02/12/fast-updates-with-tokudb/, Feb. 12, 2013, 2 Pages.
Reilink, et al., "Endoscopic Camera Control by Head Movements for Thoracic Surgery", In Proceedings of the 3rd IEEE RAS and EMBS International Conference on Biomedical Robotics and Biomechatronics (BioRob), Sep. 26, 2010, pp. 510-515.
Ritchie, Rene, "How to Use Lock Screen, Today, Popups, and Banners in Notification Center for iPhone and iPad", Retrieved from: http://www.imore.com/how-use-notification-center-iphone-ipad , Apr. 30, 2014, 8 Pages.
Roymam, "NiLs Lockscreen Notifications", Retrieved From: https://play.google.com/store/apps/details?id=com.roymam.android.notificationswidget&hl=en_IN, Jun. 28, 2014, 3 Pages.
Zhu, et al., "Keyboard before Head Tracking Depresses User Success in Remote Camera Control", In Proceedings of be 12th IFIP TC 13 International Conference on Human-Computer Interaction, Aug. 24, 2009, 14 Pages.

(56) References Cited

OTHER PUBLICATIONS

Smalley, et al., "Anisotropic Leaky-Mode Modulator for Holographic Video Displays", In Proceedings of the Nature, vol. 498, Jun. 20, 2013, 6 Pages.
Sundstedt, Veronica, "Gazing at Games: Using Eye Tracking to Control Virtual Characters", In Proceedings of the ACM SIGGRAPH 2010 Courses, Jul. 28, 2010, 85 Pages.
Teng, et al., "Fabrication of nanoscale zero-mode waveguides using microlithography for single molecule sensing", In Proceedings of the Nanotechnology, vol. 23, No. 45, Oct. 19, 2012, 7 Pages.
Thurrott, Paul, "Nokia Lumia "Black": Glance 2.0", Retrieved from: http://winsupersite.com/windows-phone/nokia-lumia-black-glance-20 , Jan. 11, 2014, 3 Pages.
Thurrott, "Surface Pro 3: Continuous Kickstand", Retrieved from: http://winsupersite.com/mobile-devices/surface-pro-3-continuous-kickstand :, May 21, 2014, 5 Pages.
Tien, et al., "Microcontact Printing of SAMs", In Proceedings of the Thin Films, vol. 24, May 28, 2014, 24 Pages.
Travis, et al., "Flat Projection for 3-D", In Proceedings of the IEEE, vol. 94 Issue: 3, Mar. 13, 2006, pp. 539-549.
Travis, et al., "Optical Design of a Flat Panel Projection Wedge Display", In Proceedings of the 9th International Display Workshops, Dec. 2002, 4 Pages.
Travis, et al., "P-127: Linearity in Flat Panel Wedge Projection", In SID Symposium Digest of Technical Papers, vol. 34, Issue 1, May 1, 2003, pp. 716-719.
Travis, et al., "P-60: LCD Smear Elimination by Scanning Ray Angle into a Light Guide", In Proceedings of SID Symposium Digest of Technical Papers vol. 35, Issue 1, May 2004, pp. 474-477.
Travis, et al., "The Design of Backlights for View-Sequential 3D", Retrieved From: https://www.microsoft.com/en-us/research/publication/design-backlights-view-sequential-3d/, Jun. 21, 2010, 4 Pages.
Valli, Alessandro, "Notes on Natural Interaction", Retrieved From: http://www.idemployee.id.tue.nl/g.w.m.rauterberg/lecturenotes/valli-2004.pdf , Sep. 2005., 80 Pages.
Vaucelle, "Scopemate, A Robotic Microscope!", Retrieved from: http://architectradure.blogspot.com/2011/1 0/at-uist-this-monday-scopemate-robotic.html, Oct. 17, 2011, 2 Pages.
Whitwam, Ryan, "How to Tweak Android's Lock Screen and Notifications", Retrieved from: http://www.tested.com/tech/android/457766-tips-and-tricks-make-androids-lock-screen-and-notifications-even-better/?icid=pets%7Chat%7Ctestedlink%7C457766-how-to-tweak-androids-lock-screen-and-notification, Sep. 18, 2013, 4 Pages.
Wiebe, Toban, "Using screen space efficiently with Gridmove", Retrieved from: http://lowerthought.wordpress.com/2010/05/15/using-screen-space-efficiently-with-gridmove/, May 15, 2010, 1 Page.
Williams, Jim, "A Fourth Generation of LCD Backlight Technology", Retrieved From: http://web.archive.org/web/20111026060848/http://cds.linear.com/docs/Application%20Note/an65f.pdf, Nov. 1995, 124 Pages.
Xu, et al., "Hand Gesture Recognition and Virtual Game Control Based on 3D Accelerometer and EMG Sensors", In Proceedings of the 14th International Conference on Intelligent User Interfaces, Feb. 8, 2009, pp. 401-405.
Xu, et al., "Vision-based Detection of Dynamic Gesture", In Proceedings of the International Conference on Test and Measurement, Dec. 5, 2009, pp. 223-226.
Yagi, The Concept of "AdapTV", Series: The Challenge of "AdapTV", In Proceedings of Broadcast Technology, Nov. 28, 2006, pp. 16-17.
Yan, et al., "Edge-Lighting Light Guide Plate Based on Micro-Prism for Liquid Crystal Display", In Journal of Display Technology, vol. 5. No. 9, Sep. 1, 2009, pp. 355-357.
Final Office Action Issued in U.S. Appl. No. 15/083,008, dated Mar. 4, 2019, 14 Pages.
"Adobe Audition/Customizing Workspaces", Retrieved From: https://helpx.adobe.com/in/audition/using/customizing-workspaces.html, May 18, 2011, 6 Pages.
"Always Connected", Retrieved From: https://web.archive.org/web/20130624104603/http://www.samsung.com/global/microsite/galaxycamera/nx/, Jun. 24, 2013, 5 Pages.
"Apple Designs a Future Built-In Stand for the iPad and More", Retrieved From: http://www.patentlyapple.com/patently-apple/2011/02/apple-designs-a-future-built-in-stand-for-the-ipad-more.html, Feb. 3, 2011, 9 Pages.
"Can I Customize my Samsung Galaxy S4 Lock Screen?", Retrieved from: http://www.samsung.com/us/support/, May 16, 2014, 12 Pages.
"Controlling Your Desktops Power Management", Retrieved From: http://www.vorkon.de/SU1210.001/drittanbieter/Dokumentation/openSUSE_11.2/manual/sec.gnomeuser.start.power_mgmt.html, Jul. 7, 2014, 6 Pages.
"Developing Next-Generation Human Interfaces using Capacitive and Infrared Proximity Sensing", Retrieved From: http://www.funkschau.de/fileadmin/media/whitepaper/files/Capacitive20and20proximity20sensing_WP.pdf, Aug. 30, 2010, 10 Pages.
"Display Control", Retrieved From: http://www.portrait.com/technology/display-control.html, Jun. 24, 2013, 5 Pages.
"DR2PA", Retrieved From: http://www.architainment.co.uk/wp-content/uploads/2012/08/DR2PA-AU-US-size-Data-Sheet-Rev-H_LOGO.pdf, Retrieved on: Sep. 17, 2012, 4 Pages.
"Edwards 1508 Series Surface Wall Mount Electromagnetic Door Holder", Retrieved From: https://web.archive.org/web/20061125230548/http://www.thesignalsource.com/documents/1508.pdf, 2000, 1 Page.
"For Any Kind of Proceeding 2011 Springtime as Well as Coil Nailers as Well as Hotter Summer Season", Retrieved from: http://www.ladyshoesworld.com/2011/09/18/for-any-kind-of-proceeding-2011-springtime-as-well-as-coil-nailers-as-well-as-hotter-summer-season/, Sep. 8, 2011, 2 Pages.
"How to Use the iPads Onscreen Keyboard", Retrieved From: http://www.dummies.com/how-to/content/how-to-use-the-ipads-onscreen-keyboard.html, 3 Pages.
"i-Blason Spring Series Premium Flexible KickStand Anti-Slippery TPU Cover Case for iPhone 4 4S (White)", Retrieved from: http://www.amazon.com/i-Blason-Premium-Flexible-KickStand-Anti-Slippery/dp/B007LCLXLU, Nov. 30, 2012, 4 Pages.
"Lock Screen Overview (Windows Runtime Apps)", Retrieved from: https://msdn.microsoft.com/en-in/library/windows/apps/hh779720.aspx, Dec. 31, 2012, 5 Pages.
"Magnetic Cell Phone Holder-Extreme Computing", Retrieved From: https://web.archive.org/web/20080328121416/http://www.extremecomputing.com/magnetholder.html, Retrieved on: May 7, 2008, 1 Page.
"Manage Multiple Windows", Retrieved from: https://web.archive.org/web/20150818093212/http://windows.microsoft.com/en-hk/windows/manage-multiple-windows#1TC=windows-7, Jul. 8, 2014, 4 Pages.
"Merge Operator", Retrieved from: https://github.com/facebook/rocksdb/wiki/Merge-Operator, Jun. 14, 2014, 10 Pages.
"Microsoft Develops Glasses-Free Eye-Tracking 3D Display", Retrieved from: http://www.tech-faq.com/microsoft-develops-glasses-free-eye-tracking-3d-display.html, Retrieved Date: Nov. 2, 2011, 3 Pages.
"Microsoft Reveals Futuristic 3D Virtual HoloDesk Patent", Retrieved from: http://www.patentlymobile.com/2012/05/microsoft-reveals-futuristic-3d-virtual-holodesk-patent.html, May 23, 2012, 9 Pages.
"Molex:PCI Express Mini Card Connector, Right Angle, Low-Profile, Mid-Mount 0.80mm (.031) Pitch", Retrieved from: http://rhu004.sma-promail.com/SQLImages/kelmscott/Molex/PDF_Images/987650-4441.Pdf, 2010, 3 Pages.
"NeXus Charging Cradle", Retrieved from: https://web.archive.org/web/20160403091111/http://www.gen-xtech.com/neXus.php, Apr. 17, 2012, 2 Pages.
"NI Releases New Machine and Machine Mikro", Retrieved from: http://www.djbooth.net/index/dj-equipment/entry/ni-releases-new-maschine-mikro/, 19 Pages.
"On-Screen Keyboard for Windows 7, Vista, XP with Touchscreen", Retrieved From: http://web.archive.org/web/20170401090218/http://comfort-software.com/on-screen-keyboard.html, Feb. 2, 2011, 3 Pages.
"Optical Sensors in Smart Mobile Devices", In Semiconductor Components Industries LLC, Nov. 2010, 13 Pages.
"Optics for Displays: Waveguide-based Wedge Creates Collimated Display Backlight", Retrieved from: http://www.optoiq.com/index/photonics-technologies-applications/lfw-display/lfw-article-display.

(56) References Cited

OTHER PUBLICATIONS articles.laser-focus-world.volume-46.issue-1.world-news.optics-for_displays.html, Jan. 1, 2010, 3 Pages.
"Organize Your Desktop Workspace for More Comfort with WindowSpace", Retrieved from: http://www.ntwind.com/software/windowspace.html, Jul. 4, 2014, 5 Pages.
"PCI Express SMT Connector-FCI", Retrieved From: https://web.archive.org/web/20070810172347/http://www.ttiinc.com/object/fp_fci_PCISMT, Feb. 2013, 1 Page.
"Real-Time Television Content Platform", Retrieved from: http://web.archive.org/web/20110623222932/http://www.accenture.com/us-en/Pages/insight-real-time-television-platform.aspx, May 28, 2002, 3 Pages.
"Rechargeable Stylus Pen", Retrieved from: https://web.archive.org/web/20130827032403/http://www.e-pens.com/uk/rechargeable-stylus-pen.html, Jul. 5, 2013, 1 Page.
"RoPD Connectors", Retrieved from: https://web.archive.org/web/20140520105144/http://www.rosenberger.de/documents/headquarters_de_en/ba_automotive/AUTO_RoPD_Flyer_2012.pdf, Jun. 2012, 6 Pages.
"SizeUp the Missing Window Manager", Retrieved from: http://www.irradiatedsoftware.com/sizeup/, Jul. 4, 2014, 3 Pages.
"Split the Windows Desktop: How to Divide a Single Large Desktop into Multiple Smaller Ones", Retrieved from: http://www.actualtools.com/multiplemonitors/split-windows-desktop-how-to-divide-single-large-desktop-into-smaller-ones.shtml, Retrieved Date: Jul. 7, 2014, 3 Pages.
"Surface", Retrieved From: http://www.microsoft.com/surface/en-us/support/hardware-and-drivers/type-cover, Retrieved on:Dec. 26, 2013, 6 Pages.
"Teach Me Simply", Retrieved From: http://techmesimply.blogspot.in/2013/05/yugatech_3.html, May 3, 2013, pp. 1-6.
"The New Lenovo Yoga Tablet 8", Retrieved from: http://web.archive.org/web/20150320022048/http://www.pricepanda.co.in/lenovo-yoga-tablet-8-pid1529091/, Jun. 11, 2014, 3 Pages.
"Using Flickr to Organise a Collection of Images", Retrieved from: https://web.archive.org/web/20130402043816/http://www.jiscdigitalmedia.ac.uk/guide/using-flickr-to-organise-a-collection-of-images, Apr. 2, 2013, 17 Pages.
"Office Action Issued in European Patent Application No. 13860271.9", dated Nov. 5, 2018, 4 Pages.
"Final Office Action Issued in U.S. Appl. No. 15/083,008", dated Apr. 9, 2018, 16 Pages.
"Non Final Office Action Issued in U.S. Appl. No. 15/083,008", dated Aug. 7, 2018, 21 Pages.
"Office Action Issued in Japanese Patent Application No. 2016-505516", dated Feb. 6, 2018, 3 Pages.
"Office Action Issued in Japanese Patent Application No. 2017-078955", dated Mar. 13, 2018, 8 Pages.
Ando, et al., "Development of Three-Dimensional Microstages Using Inclined Deep-Reactive Ion Etching", In Journal of Microelectromechanical Systems, vol. 16, Issue 3, Jun. 1, 2007, 9 pages.
Arar, Yardena, "HP Envy Rove: A Movable (If Underpowered) All-In-One PC", Retrieved from: http://web.archive.org/web/20130821102541/http://www.pcworld.com/article/2047032/hp-envy-rove-a-movable-if-underpowered-all-in-one-pc.html, Aug. 21, 2013, 6 Pages.
Bert, et al., "Passive Matrix Addressing of Electrophoretic Image Display", In Proceedings of the 22nd International Display Research Conference, Oct. 1, 2002, pp. 251-254.
Boual, et al., "Wedge Displays as Cameras", In SID Symposium Digest of Technical Papers, vol. 37, Issue 1, Jun. 2006, pp. 1999-2002.
Boulanger, Cati, "Architectradure", Retrieved From: http://architectradure.blogspot.com/2011/10/at-uist-this-monday-scopemate-robotic.html, Oct. 17, 2011, 2 Pages.
Breath, "ThinkSafe: A Magnetic Power Connector for Thinkpads", Retrieved from: http://www.instructables.com/id/ThinkSafe%3A-A-Magnetic-Power-Connector-for-Thinkpad/, Oct. 26, 2006, 9 Pages.
Burge, et al., "Determination of Off-Axis Aberrations of Imaging Systems Using On-Axis Measurements", In Proceedings of the SPIE 8129, Novel Optical Systems Design and Optimization XIV, 81290F, Sep. 21, 2011, 10 Pages.
Callaghan, Mark, "Types of Writes", Retrieved from: http://smalldatum.blogspot.in/2014/04/types-of-writes.html, Apr. 16, 2014, 3 Pages.
Camp, Jeffrey, et al., "Lenovo Thinkpad Tablet 2 Review", Retrieved from: http://www.digitaltrends.com/tablet-reviews/lenovo-thinkpad-tablet-2-review/, Feb. 12, 2013, 7 Pages.
Campbell, "Future iPhones May Unlock, Hide Messages based on a Users Face", Retrieved from: http://appleinsider.com/articles/13/12/03/future-iphones-may-unlock-hide-messages-based-on-a-users-face, Dec. 3, 2013, 11 Pages.
"Non Final Office Action Issued in U.S. Appl. No. 15/083,008", dated Jul. 19, 2019, 15 Pages.
"Office Action Issued in Korean Patent Application No. 10-2014-7024500", dated Aug. 7, 2019, 15 Pages.
"Final Office Action Issued in U.S. Appl. No. 15/083,008", dated Jan. 16, 2020, 14 Pages.
"Non Final Office Action Issued in U.S. Appl. No. 15/083,008", dated Feb. 28, 2020, 14 Pages.

\* cited by examiner

SYSTEM AND METHOD FOR ACCESSORY DEVICE ARCHITECTURE THAT PASSES VIA INTERMEDIATE PROCESSOR A DESCRIPTOR WHEN PROCESSING IN A LOW POWER STATE

RELATED APPLICATIONS

This application is a continuation of and claims priority to U.S. patent application Ser. No. 15/050,072, filed Feb. 22, 2016, entitled "Accessory Device Architecture", which is a continuation of and claims priority to U.S. patent application Ser. No. 13/527,263, filed Jun. 19, 2012, entitled "Accessory Device Architecture", which claims priority under 35 U.S.C. § 119(e) to U.S. Provisional Patent Application No. 61/646,799, filed May 14, 2012, the disclosures of each of which are hereby incorporated by reference in their entireties. This application also incorporates the following applications by reference in their entireties: U.S. Pat. No. 8,498,100, issued Jul. 30, 2013, and titled "Flexible Hinge and Removable Attachment"; and U.S. Pat. No. 8,896,993, issued Nov. 25, 2014, and titled "Input Device Layers and Nesting".

BACKGROUND

Mobile computing devices have been developed to increase the functionality that is made available to users in a mobile setting. For example, a user may interact with a mobile phone, tablet computer, or other mobile computing device to check email, surf the web, compose texts, interact with applications, and so on.

However, conventional techniques that are made available to mobile computing devices to connect accessory devices may consume significant amounts of power, which may hinder the mobility of the device. Further, these conventional techniques could in some instances involve a complicated process by which the accessory device is recognized by the computing device, which could interfere with a user's experience with the device.

SUMMARY

An accessory device architecture is described. In one or more implementations, data is received from an accessory device at an intermediate processor of a computing device, the data usable to enumerate functionality of the accessory device for operation as part of a computing device that includes the intermediate processor. The data is passed by the intermediate processor to an operating system executed on processor of the computing device to enumerate the functionality of the accessory device as part of the intermediate processor.

In one or more implementations, an intermediate processor comprises one or more integrated circuits configured to receive a human interface device descriptor from an accessory device via an interface that supports removable physical and communicative coupling to the accessory device and communicate the human interface device descriptor to a processor that is configured to execute an operating system such that the operating system is made aware of functionality of the accessory device as described in the human interface device descriptor.

In one or more implementations, a computing device includes an interface configured to support a removable communicative coupling with an accessory device, a processor configured to execute an operating system, and an intermediate processor communicatively coupled to the interface and the processor, the intermediate processor configured to support a pass through mode in which human interface device reports received by the intermediate processor from the accessory device via the interface are passed to the operating system without modification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
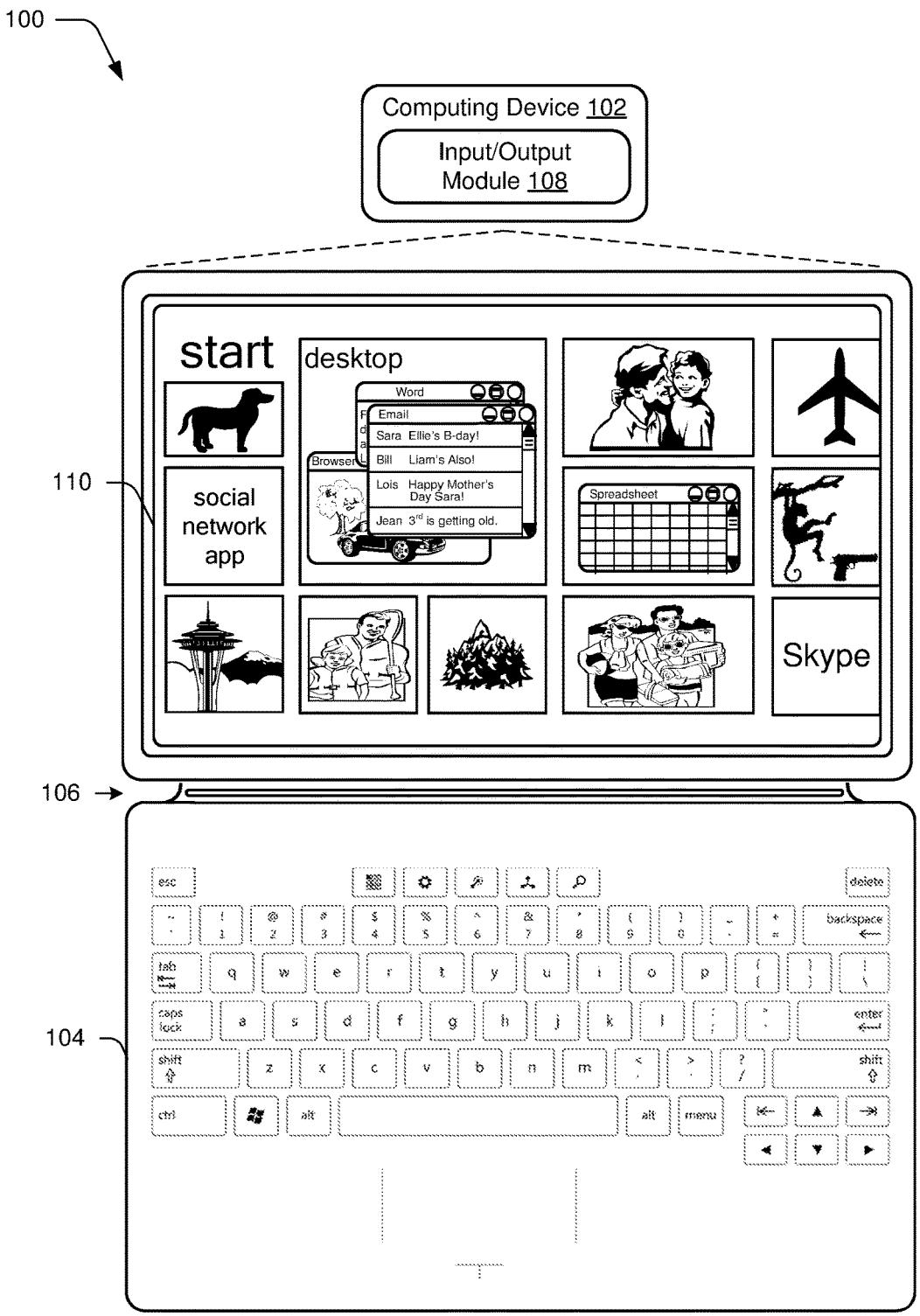
FIG. 1 is an illustration of an environment in an example implementation that is operable to employ the techniques described herein.

Conventional techniques were developed to allow users to simply attach accessory devices for interaction with a computing device, such as input devices, storage devices, peripheral devices, and so on. However, these conventional techniques could consume significant amounts of power. Consequently, additional techniques were developed to address these shortcomings, but these techniques could limit functionality that was made available to the accessory device, could result in increased resource utilization on the part of the computing device to interact with the accessory device, and so on.

Techniques are described that involve accessory device architectures. In one or more implementations, an architecture may be configured to employ an intermediate processor that is disposed between a processor of the computing device and functionality of the accessory device, e.g., a controller of the accessory device. The intermediate processor may be configured to reduce power consumption of the computing device, such as to permit operation of sensors without waking the processor of the computing device that executes the operating system and so on.

In order to promote flexibility of the architecture, the intermediate processor may support a pass through mode in which data is passed between the accessory device and the operating system without modification by the intermediate processor. In this way, the intermediate processor may support functionality of a wide range of accessory devices without performing updates to firmware of the intermediate processor.

The architecture may also be configured to support techniques to enumerate the accessory device in a manner that mimics plug-and-play functionality without encountering the drawbacks of conventional techniques, such as power consumption as described above. This may be performed by utilizing a communication technique that consumes less power (e.g., through clocking, lower power consumption when operational, and so on) than conventional techniques, although these techniques may also be support in other implementations. This communication technique may further be configured through the architecture to support human interface device (HID) reports such that functionality of the accessory interface device may be enumerated (e.g., via an HID table) to support a consistent technique in which accessory devices having different functionality may interact with the computing device. In this way, an operating system may be made aware of functionality of the accessory device without drawbacks of conventional transport techniques. Further description of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the techniques described herein. The illustrated environment 100 includes an example of a computing device 102 that is physically and communicatively coupled to an accessory device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may also relate to software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the accessory device 104, keys of a virtual keyboard displayed by the display device 110 to identify gestures and cause operations to be performed that correspond to the gestures that may be recognized through the accessory device 104 and/or touch-screen functionality of the display device 110, and so forth. Other input devices are also contemplated, such as a mouse, track pad, camera to detect gestures, and so on. Thus, the input/output module 108 may support a variety of different input techniques by recognizing and leveraging a division between types of inputs including key presses, gestures, and so on.

In the illustrated example, the accessory device 104 is configured as a keyboard having a QWERTY arrangement of keys although other arrangements are also contemplated, such as storage devices, peripheral devices, output devices, and so on. Further, other non-conventional configurations are also contemplated, such as a game controller, configuration to mimic a musical instrument, and so forth. Thus, the accessory device 104 and keys incorporated by the accessory device 104 may assume a variety of different configurations to support a variety of different functionality.

As previously described, the accessory device 104 is physically and communicatively coupled to the computing device 102 in this example through use of a flexible hinge 106, although other examples are also contemplated such as a wireless connection. The flexible hinge 106 is flexible in that rotational movement supported by the hinge is achieved through flexing (e.g., bending) of the material forming the hinge as opposed to mechanical rotation as supported by a pin, although that embodiment is also contemplated. Further, this flexible rotation may be configured to support movement in one direction (e.g., vertically in the figure) yet restrict movement in other directions, such as lateral movement of the accessory device 104 in relation to the computing device 102. This may be used to support consistent alignment of the accessory device 104 in relation to the computing device 102, such as to align sensors used to change power states, application states, and so on.

The flexible hinge 106, for instance, may be formed using one or more layers of fabric and include conductors formed as flexible traces to communicatively couple the accessory device 104 to the computing device 102 and vice versa. This communication, for instance, may be used to communicate a result of a key press to the computing device 102, receive power from the computing device, perform authentication, provide supplemental power to the computing device 102, and so on.

Figure 2:
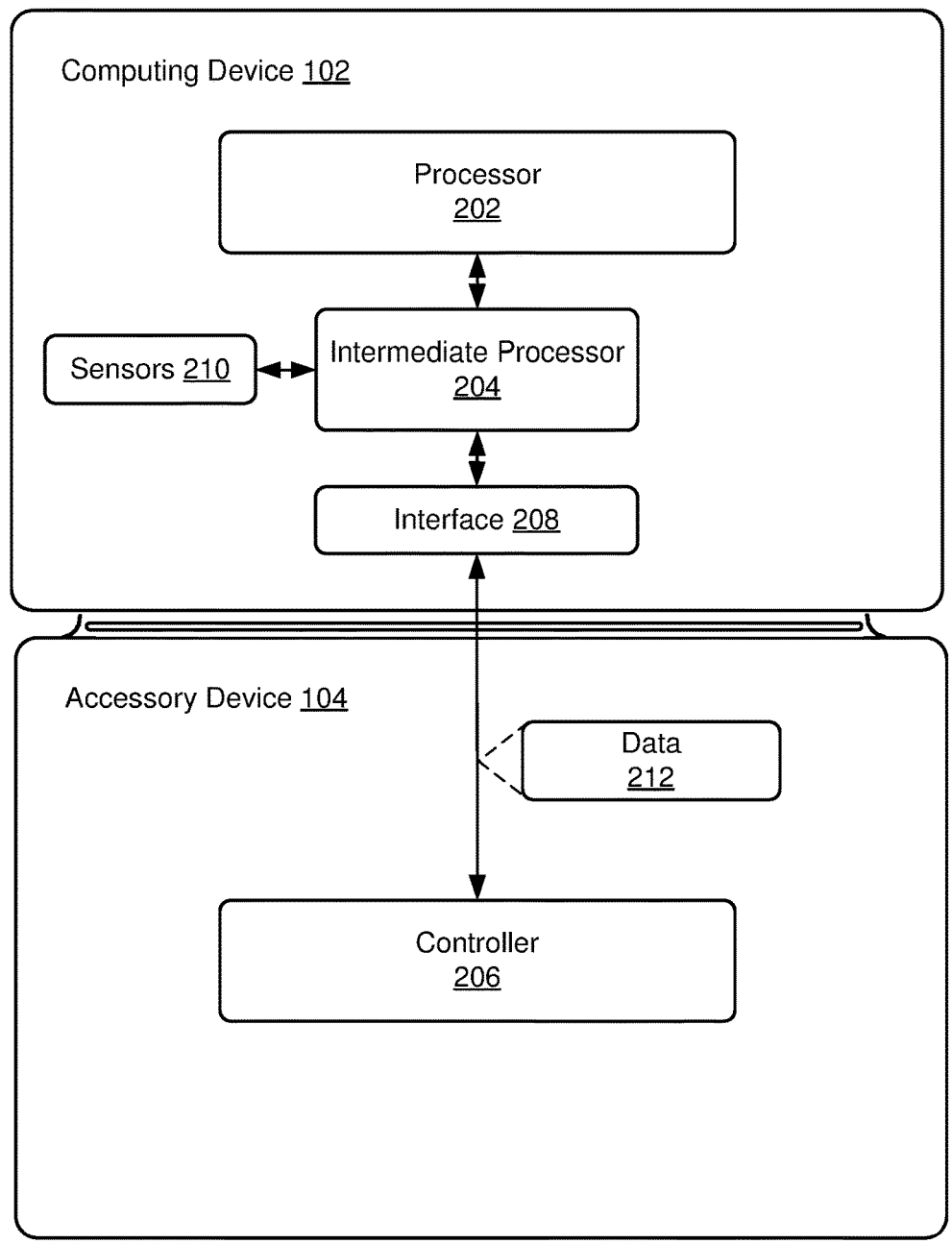
FIG. 2 is an illustration of an example implementation showing an architecture employable by a computing device and accessory device of FIG. 1.

FIG. 2 depicts an example implementation showing an architecture 200 employable by the computing device 102 and the accessory device 104 of FIG. 1. The illustrated architecture 200 includes a processor 202 and an intermediate processor 204 of a computing device 102 that is communicatively coupled to a controller 206 of the accessory device via an interface 208. The processor 202 may be configured to provide primary processing resources of the computing device 102, such as to execute an operating system, applications, and other software of the computing device 102. Consequently, the processor 202 may consume significant amounts of power, relatively, when in an active state as opposed to a sleep state.

In order to reduce power consumed by the processor 202, the architecture 200 may employ an intermediate processor 204. The intermediate processor 204 may be configured to provide a variety of different functionality, such as to provide functionality while the processor 202 is in a sleep state. This functionality, for instance, may include communication with one or more sensors 210 of the computing device 102 without communication through the processor 202. The intermediate processor 204 may leverage this communication to support waking of the accessory device 104, processor 202, and so on. Thus, these components and devices may remain in a sleep state until a determination is made by the intermediate processor 204 to "wake" these components and devices, thereby conserving power. A variety of other examples are also contemplated without departing from the spirit and scope thereof.

In one or more implementations, the intermediate processor 204 is enumerated to an operating system executed on the processor 202 and thus is "viewable" by the operating system. The intermediate processor 204 may also be configured to communicate with the accessory device 104, e.g., a controller 206, through an interface 208. The accessory device 104, for instance, may be removably physically coupled to the interface 208 of the computing device 102, which may be used to support a communicative coupling such that data 212 may be communicated between the computing device 102 and the accessory device 104. The transport mechanism (e.g., the communicative coupling) and data 212 communicated via this transport mechanism may take a variety of different configurations, an example of which is shown in relation to FIG. 3.

Figure 3:
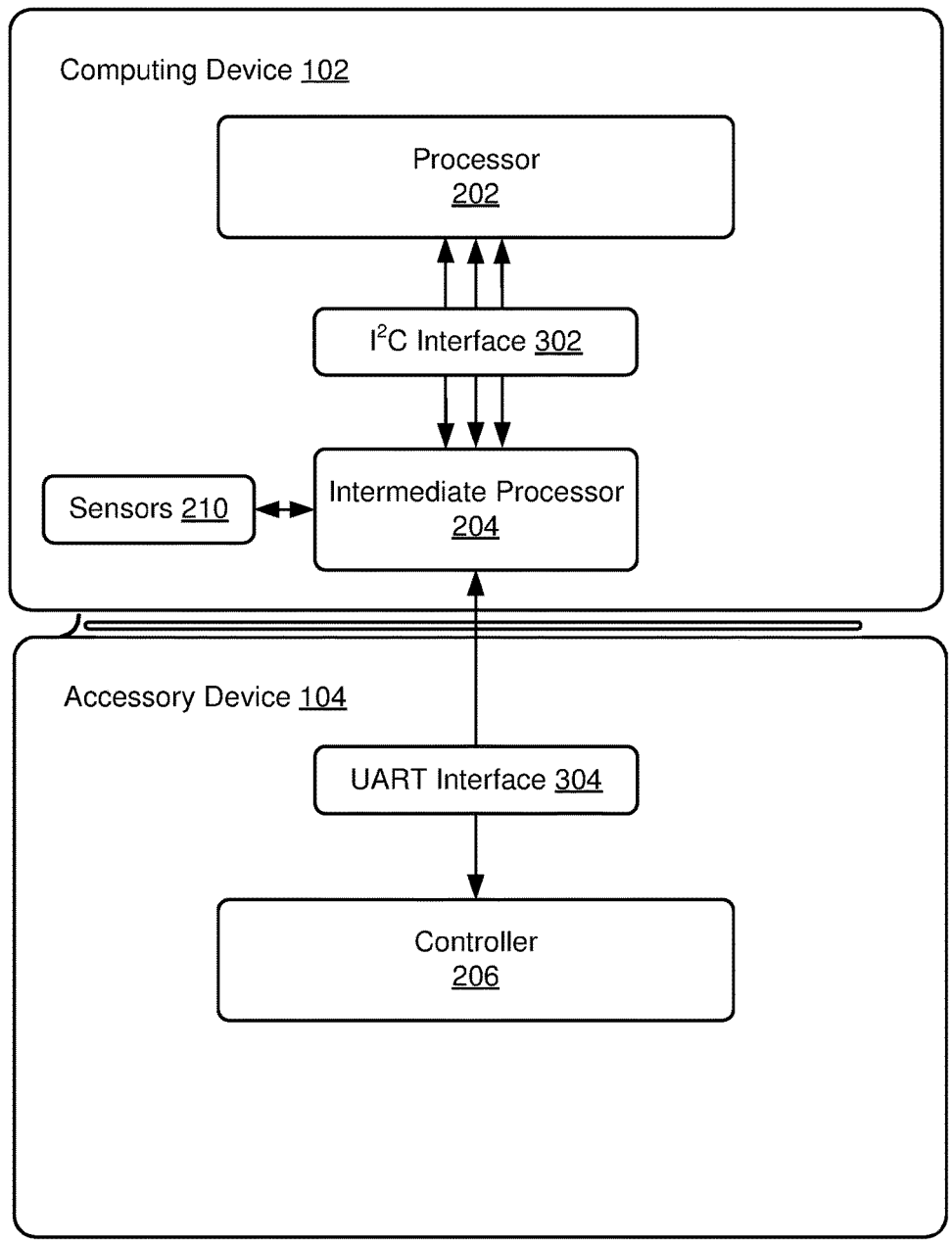
FIG. 3 is an example implementation of an architecture showing a transport mechanism to support a communicative coupling in greater detail.

FIG. 3 is an example implementation of an architecture 300 showing a transport mechanism to support a communicative coupling in greater detail. In the illustrated example, the architecture 300 employs a transport mechanism that is configured to consume less power than conventional transport mechanisms. An example of such a mechanism is an I²C interface 302 (i.e., Inter-Integrated Circuit), which may be configured to consume less power than conventional transport mechanisms. For example, the I²C interface 302 may be configured as a transport mechanism that consumes 1.8 volts versus 5 volts and over in conventional mechanisms. This I²C interface 302 may also be configured to reduce power consumption through clocking, in which the mechanism is clocked when actively engaged in transport but is not otherwise as opposed to conventional techniques in which clocking is performed continuously. Other examples are also contemplated, such as to support clock stretching.

In the illustrated example, the I²C interface 302 is implemented using three wires or less, which include two data communication lines and a ground to support communication between the processor 202 and intermediate processor 204. This simplifies implementation of this transport mechanism as opposed to conventional transport mechanisms, thereby reducing manufacturing and assembly processes and reducing costs. A UART interface 304 is shown as communicatively coupling the intermediate processor 204 to the controller 206. Other transport mechanisms are also contemplated without departing from the spirit and scope thereof which may consume higher or lower amounts of power. Naturally, a variety of other implementations are also contemplated which may incorporate similar functionality. Regardless of a transport mechanism utilized, data communicated via the mechanism may be configured in a variety of different ways, an example of which is described in relation to the following figure.

Figure 4:
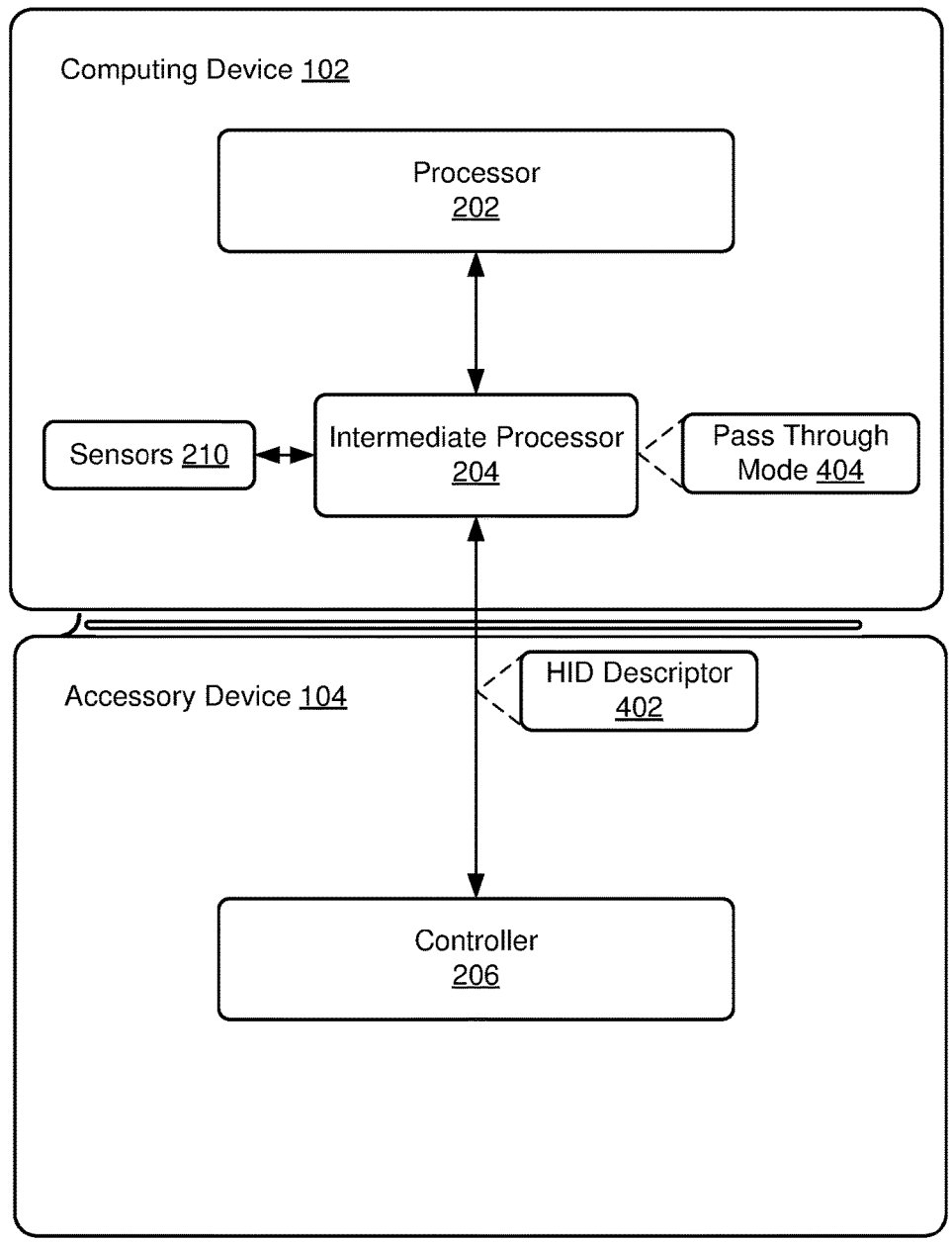
FIG. 4 is an example implementation of an architecture showing a configuration of data of FIG. 2 as in compliance with human interface device formats transported via the transport mechanism of FIG. 3.

FIG. 4 is an example implementation of an architecture 400 showing a configuration of data of FIG. 2 as in compliance with human interface device formats transported via a transport mechanism. Data communicated between the accessory device 104 and the computing device 102 may be configured in a variety of ways to support a variety of functionality. In the illustrated example, the data 208 is configured in accordance with human interface device formats to enumerate, denumerate, and other permit communication between the accessory device 104 and the computing device 102 over I²C interface 302, although other interfaces are also contemplated.

For example, the controller 206 of the accessory device 104 may "talk" with the processor 202 through the intermediate processor 204 using I²C as previously described. This may make it appear that the accessory device 104 is communicatively connected to the processor 202. For instance, from an operating system's point of view that is executed on the processor 202, the enumeration and denumeration of the accessory device 104 may be performed as if the accessory device 104 was physically connected to the processor 202, even though it is not.

Human interface device (HID) references a type of communication that may support bidirectional communication between the accessory device 104 and the computing device 102. HID may be implemented as a self-describing protocol in which packages communicated between the devices may include a variety of different data types and formats, which may be described as part of the communication.

An HID descriptor 402, for instance, may be communicated from the controller 206 of the accessory device 104 it the computing device 102. The HID descriptor 402 may be configured as an array of bytes that describes data packets that are to be communicated between the accessory device 104 and the computing device 102. For example, the HID descriptors 402 may describe functionality that is supported by the accessory device 104 and how interaction with that functionality is to be performed. The HID descriptor 402 may then be parsed by the computing device 102 (e.g., through execution of an operating system) to determine how to interpret data received from the accessory device 104 as well as how to communicate with the accessory device 104.

For example, the HID descriptors 402 may be configured as device descriptors or report descriptors that are stored in firmware of the device. A report descriptor is information describing a format of data that the accessory device 104 is to send to the computing device as well as data that may be sent to the accessory device 104. A device descriptor is information describing functionality available from the accessory device 104, such as input functionality and types (e.g., keys, mouse), and so forth.

Thus, these types of descriptors may be used to report the type of device it is, version information, vendor identifier, product identifier, and other information that is usable by the computing device 102, and more particularly an operating system of the computing device 102, to enumerate and denumerate the device as if it were inherently a plug and play device. Data may then be communicated between the devices (e.g., in the form of HID reports) in accordance with the descriptors, such as in response to inputs, from sensors 210 through the intermediate processor 204 to the controller 206 of the accessory device 104, and so on. Thus, the reports may describe inputs initiated by the accessory device 104, as well as data originating from the computing device 102 to be communicated to the accessory device 104.

The intermediate processor 204 may be configured to support a pass through mode 404 in which data received by the intermediate processor 204 from the controller 206 of the accessory device 104 is passed to the processor 202 without modification. In this way, the intermediate processor 204 may be configured to address a variety of different accessory devices 104, even devices having functionality that will be made available in the future, without updating the intermediate processor 204.

For example, HID reports (e.g., HID mouse report and HID keyboard report) are passed from the accessory device 104 through the intermediate processor 204 to the processor 202 in the pass through mode 404. Reports from the accessory device 104 may be packaged in such a way as to be consumable by the computing device 102 without additional modification by the intermediate processor 204. This provides support of future accessory devices without a firmware modification to the intermediate processor 204 each time a new accessory device is released. Also, this provides a standard specification by which future accessory devices pass information to the host.

The intermediate processor 204 may be configured to support a variety of other functionality. For example, the accessory device 104 may not able to manage its own power without information from the intermediate processor 204. Because of this, the intermediate processor 204 may be implemented to manage power of the accessory device 104. In another example, the accessory device 104 and the intermediate processor 204 may manage power using interfaces. The accessory device 104, for instance, may register with the intermediate processor 204.

This registration may be performed to cause reports to be sent from the intermediate processor 204 to the controller 206 of the accessory device 104. The reports, for instance, may include values from the sensors 210, such as when values of an accelerometer change by a certain level (e.g., above a threshold) in a defined amount of time. This alleviates the intermediate processor 204 from managing the power of each accessory device and is a cleaner solution in instances in which the accessory device 104 has increased knowledge on how to manage its own power. A variety of other examples are also contemplated, such as to report status that is used by the accessory device 104 to determine what power state in which to place the accessory device 104.

Example Procedure

The following discussion describes accessory device architecture techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
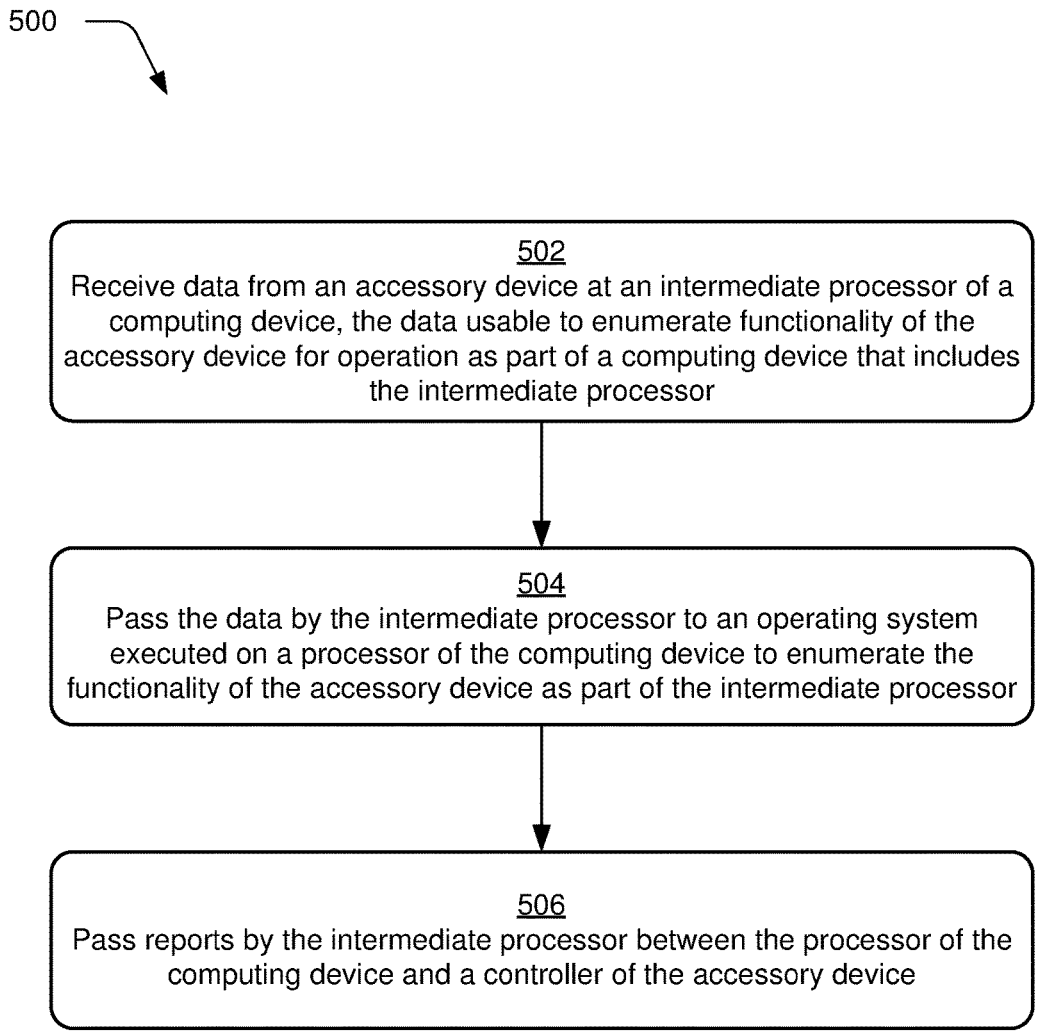
FIG. 5 is a flow diagram depicting a procedure in an example implementation in which HID descriptors and HID reports are communicated using a pass through mode by an intermediate processor between a processor of a computing device and an accessory device.

FIG. 5 depicts a procedure 500 in an example implementation in which HID descriptors and HID reports are communicated using a pass through mode by an intermediate processor between a processor of a computing device and an accessory device. Data is received from an accessory device at an intermediate processor of a computing device, the data usable to enumerate functionality of the accessory device for operation as part of a computing device that includes the intermediate processor (block 502). The data, for instance, may be configured as one or more HID descriptors that may be used to enumerate the accessory device 104. This may include device and report descriptors as previously described to self-described the device in a standardized way.

The data may be passed by the intermediate processor to an operating system executed on a processor of the computing device to enumerate the functionality of the accessory device (block 504). This may include enumeration of the functionality as part of the intermediate processor 204, enumeration such that the accessory device 104 is enumerated by the intermediate processor 204 is not, and so on. Thus, the descriptors may be leveraged to provide a technique that is flexible in describing functionality that is available from the accessory device 104.

Additionally, in one or more implementations the intermediate processor 204 is enumerated as a device by the operating system such that the intermediate processor 204 is viewable by the operating system. However, in some instances the operating system may not recognize additional devices that are coupled to that device, and thus may not be able to recognize the accessory device 104. Accordingly, in such an instance the functionality of the accessory device 104 may be enumerated as part of the intermediate processor 204 such that this functionality is made available to the operating system. Thus, in this instance the accessory device 104 is not enumerated as a separate device itself in addition to the intermediate processor 204. Other examples are also contemplated in which separate enumeration is performed.

Example System and Device

Figure 6:
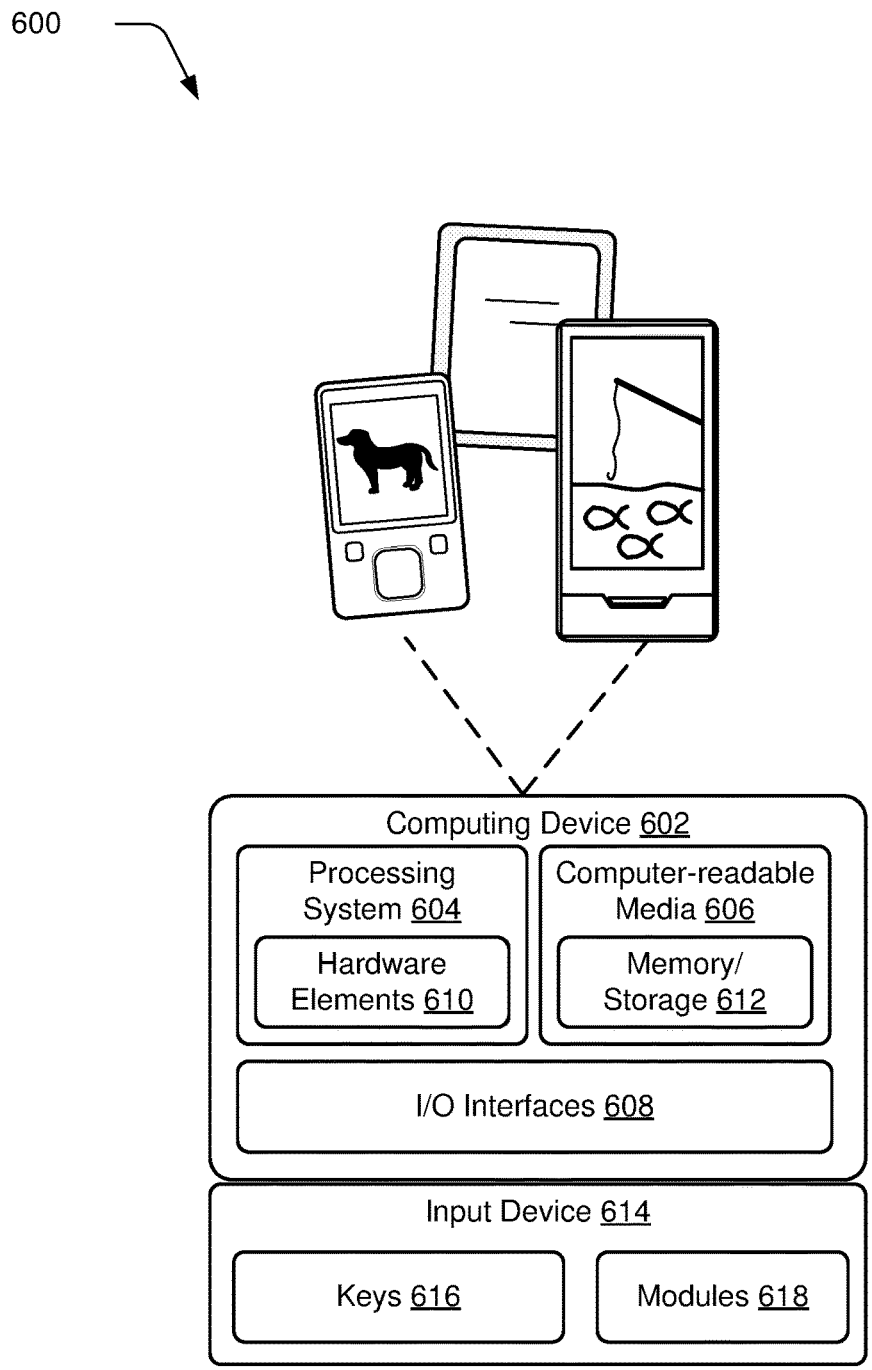
FIG. 6 illustrates an example system including various components of an example device that can be implemented as any type of computing device as described with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. The computing device 602 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways to support user interaction.

The computing device 602 is further illustrated as being communicatively and physically coupled to an input device 614 that is physically and communicatively removable from the computing device 602. In this way, a variety of different input devices may be coupled to the computing device 602 having a wide variety of configurations to support a wide variety of functionality. In this example, the input device 614 includes one or more keys 616, which may be configured as pressure sensitive keys, mechanically switched keys, and so forth.

The input device 614 is further illustrated as include one or more modules 618 that may be configured to support a variety of functionality. The one or more modules 618, for instance, may be configured to process analog and/or digital signals received from the keys 616 to determine whether a keystroke was intended, determine whether an input is indicative of resting pressure, support authentication of the input device 614 for operation with the computing device 602, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A computing device comprising:
   a first processor configured to execute an operating system of the computing device;
   an interface supporting communicative coupling between the computing device and an accessory device; and
   a second processor communicatively coupled to the first processor and the interface, the second processor being configured to:
   communicatively couple to the accessory device via the interface;
   operate when the first processor is in a low power state;
   receive data usable to enumerate functionality of the accessory device when the first processor is in the low power state; and
   communicate to the first processor information regarding the functionality of the accessory device described in the received data;
   wherein the first processor is configured to communicate with the accessory device through the second processor.

2. A computing device as described in claim 1, wherein the functionality of the accessory device is communicated to the first processor as functionality of the second processor so that the functionality of the accessory device is made available to the operating system.

3. A computing device as described in claim 1, wherein the functionality of the accessory device is communicated to the first processor as functionality of a separate device so that the accessory device is viewable by the operating system.

4. A computing device as described in claim 1, wherein the interface is configured to use a wireless connection for the communicative coupling between the computing device and the accessory device.

5. A computing device as described in claim 1, wherein the second processor is configured to provide reports including sensor data obtained from one or more sensors of the computing device to the accessory device that cause the accessory device to perform power management.

6. A computing device as described in claim 1, wherein the second processor is communicatively coupled to the first processor via a communications interface that is clocked when actively engaged in transport but is not otherwise clocked.

7. A computing device as described in claim 1, wherein the received data identifies a data format for use in interaction between the computing device and the functionality of the accessory device.

8. A computing device as described in claim 1, wherein the received data identifies a device type of the accessory device.

9. A computing device as described in claim 1, wherein the received data includes one or more of a vendor identifier (VID) of the accessory device or a product identifier (PID) of the accessory device.

10. A computing device as described in claim 1, wherein the received data identifies a version of the accessory device.

11. A method comprising:
    receiving, at a first processor of a computing device, data usable to enumerate functionality of an accessory device communicatively coupled to the first processor while a second processor of the computing device is in a low power state;
    communicating, from the first processor to the second processor, information regarding the functionality of the accessory device described in the received data; and
    communicating between the second processor and the accessory device through the first processor based on the information regarding the functionality of the accessory device.

12. A method as described in claim 11, wherein the communication of the information includes passing the received data from the first processor to the second processor without modifying the received data.

13. A method as described in claim 11, further comprising communicatively coupling the accessory device to the computing device using a wireless connection.

14. A method as described in claim 11, wherein the information regarding the functionality of the accessory device identifies one or more of:
    a data format for use in interaction between the computing device and the functionality of the accessory device;
    a device type of the accessory device;
    a vendor identifier (VID) of the accessory device;
    a product identifier (PID) of the accessory device;
    a version of the accessory device.

15. A first processor configured to:
    be communicatively coupled to an accessory device;
    be communicatively coupled to a second processor;
    receive data usable to enumerate functionality of the accessory device when the second processor is in a low power state;
    communicate to the second processor information regarding the functionality of the accessory device described in the received data for use by the second processor to interact with the functionality of the accessory device via the communicative coupling between the first processor and the accessory device; and
    operate when the second processor is in the low power state.

16. A first processor as described in claim 15, wherein the first processor is configured to:
    communicate the information regarding the functionality of the accessory device to the second processor as functionality of the first processor so that the functionality of the accessory device is made available to an operating system executed on the second processor to enumerate the functionality of the accessory device as part of the first processor; or
    communicate the information regarding the functionality of the accessory device to the second processor as functionality of a separate device so that the accessory device is viewable by the operating system.

17. A first processor device as described in claim 15, wherein the communicative coupling between the first processor and the accessory device is a wireless connection.

18. A first processor as described in claim 15, wherein the first processor is configured to be communicatively coupled to the processor via a communications interface that is clocked when actively engaged in transport but is not otherwise clocked.

19. A first processor as described in claim 15, wherein the information regarding the functionality of the accessory device identifies one or more of:
    a data format for use in interaction with the functionality of the accessory device;
    a device type of the accessory device;
    a vendor identifier (VID) of the accessory device;
    a product identifier (PID) of the accessory device;
    a version of the accessory device.

20. A first processor as described in claim 15, wherein the first processor is configured to provide reports including sensor data obtained from one or more sensors of the computing device to the accessory device that cause the accessory device to perform power management.

* * * * *